United States Patent
Fukuhara

(10) Patent No.: US 7,353,028 B2
(45) Date of Patent: Apr. 1, 2008

(54) PROGRAM, RELAY APPARATUS CONTROL METHOD, WIRELESS COMMUNICATING APPARATUS CONTROL METHOD, AND SYSTEM

(75) Inventor: Yoshiyuki Fukuhara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 121 days.

(21) Appl. No.: 10/999,794

(22) Filed: Nov. 29, 2004

(65) Prior Publication Data
US 2006/0045033 A1 Mar. 2, 2006

(30) Foreign Application Priority Data
Aug. 26, 2004 (JP) .............................. 2004-246601

(51) Int. Cl.
*H04Q 7/20* (2006.01)
*H04Q 7/00* (2006.01)

(52) U.S. Cl. ..................... 455/436; 455/437; 455/438; 370/331; 370/332

(58) Field of Classification Search ................ 455/438, 455/418, 445, 41.2, 11.1, 436, 437, 442–444, 455/432.1, 450, 453; 370/236, 331–333
See application file for complete search history.

(56) References Cited

U.S. PATENT DOCUMENTS

| | | | | |
|---|---|---|---|---|
| 5,640,414 A * | 6/1997 | Blakeney et al. | ............ | 375/130 |
| 6,546,058 B1 * | 4/2003 | Gilhousen et al. | .......... | 375/285 |
| 6,608,823 B1 * | 8/2003 | Kito | .............. | 370/331 |
| 6,901,061 B1 * | 5/2005 | Joo et al. | ..................... | 370/335 |
| 6,975,608 B1 * | 12/2005 | Park et al. | .................. | 370/332 |
| 2003/0119507 A1 * | 6/2003 | Semper | ....................... | 455/436 |
| 2005/0096052 A1 * | 5/2005 | Csapo et al. | ................. | 455/439 |

FOREIGN PATENT DOCUMENTS

| | | |
|---|---|---|
| JP | 7-23442 | 1/1995 |
| JP | 9-83545 | 3/1997 |
| JP | 10-89980 | 4/1998 |
| JP | 2002-185458 | 6/2002 |

* cited by examiner

*Primary Examiner*—George Eng
*Assistant Examiner*—Nam Huynh
(74) *Attorney, Agent, or Firm*—Katten Muchin Rosenman LLP

(57) ABSTRACT

Measurement packets periodically transmitted from a terminal are received by an access point, a reception level value is detected, in the case of the Measurement packet from the terminal which has been notified of connection permission, the reception level value is registered into a management table (association table). In the case of the Measurement packet from the terminal which is not notified of the connection permission, the reception level value is notified to another access point which has been notified of the connection permission and the reception level value from another access point is further registered into the management table. The own reception level value registered in the management table is compared with the reception level value of another access point. If the reception level value of another access point exceeds the own reception level value, the connection permission to the terminal is cancelled and the switching to the next access point is notified. Even if different channels have been set in the adjacent access points, the roaming for switching the connection of the terminal to the access point at which optimum communication quality is obtained can be executed.

28 Claims, 21 Drawing Sheets

| ACCESS POINT NAME | USING CHANNEL NUMBER |
|---|---|
| AP10-1 | CH1 |
| AP10-2 | CH2 |
|  |  |
|  |  |
|  |  |

FIG. 10A 60-1

| TERMINAL NAME | OWN RECEPTION LEVEL VALUE | RECEPTION LEVEL VALUE OF AP 10-2 | |
|---|---|---|---|
| DE12-1 | RL11 | RL12 | |
| DE12-2 | RL21 | RL22 | |
| DE12-3 | RL31 | RL32 | |

FIG. 10B 60-11

| TERMINAL NAME | OWN RECEPTION LEVEL VALUE | RECEPTION LEVEL VALUE OF AP 10-2 | |
|---|---|---|---|
| DE12-1 | 9R | 0R | |
| DE12-2 | 9R | 4R | |
| DE12-3 | 7R | 6R | |

FIG. 10C 60-12

| TERMINAL NAME | OWN RECEPTION LEVEL VALUE | RECEPTION LEVEL VALUE OF AP 10-2 | |
|---|---|---|---|
| DE12-1 | 9R | 0R | |
| DE12-2 | 5R | 9R | |
| DE12-3 | 7R | 6R | |

FIG. 10D 60-13

| TERMINAL NAME | OWN RECEPTION LEVEL VALUE | RECEPTION LEVEL VALUE OF AP 10-2 | |
|---|---|---|---|
| DE12-1 | 9R | 0R | |
| DE12-3 | 7R | 6R | |

90-1

| TERMINAL NAME | DISTANCE | RECEPTION LEVAL VALUE |
|---|---|---|
| DE12-1 | 2L | 9R |
| DE12-2 | 2L | 9R |
| DE12-3 | 4L | 7R |
| DE12-4 | 15L | 0R |
| DE12-5 | 7L | 4R |

90-2

| TERMINAL NAME | DISTANCE | RECEPTION LEVAL VALUE |
|---|---|---|
| DE12-1 | 15L | 0R |
| DE12-2 | 7L | 4R |
| DE12-3 | 5L | 6R |
| DE12-4 | 7L | 4R |
| DE12-5 | 2L | 9R |

FIG. 12A 60-2

| TERMINAL NAME | OWN RECEPTION LEVEL VALUE | RECEPTION LEVEL VALUE OF AP 10-1 | |
|---|---|---|---|
| DE12-4 | RL42 | RL41 | |
| DE12-5 | RL52 | RL51 | |

FIG. 12B 60-21

| TERMINAL NAME | OWN RECEPTION LEVEL VALUE | RECEPTION LEVEL VALUE OF AP 10-1 | |
|---|---|---|---|
| DE12-4 | 4R | 0R | |
| DE12-5 | 9R | 4R | |

FIG. 12C 60-22

| TERMINAL NAME | OWN RECEPTION LEVEL VALUE | RECEPTION LEVEL VALUE OF AP 10-1 | |
|---|---|---|---|
| DE12-4 | 4R | 0R | |
| DE12-5 | 9R | 4R | |
| DE12-2 | 0R→9R | 0R→5R | |

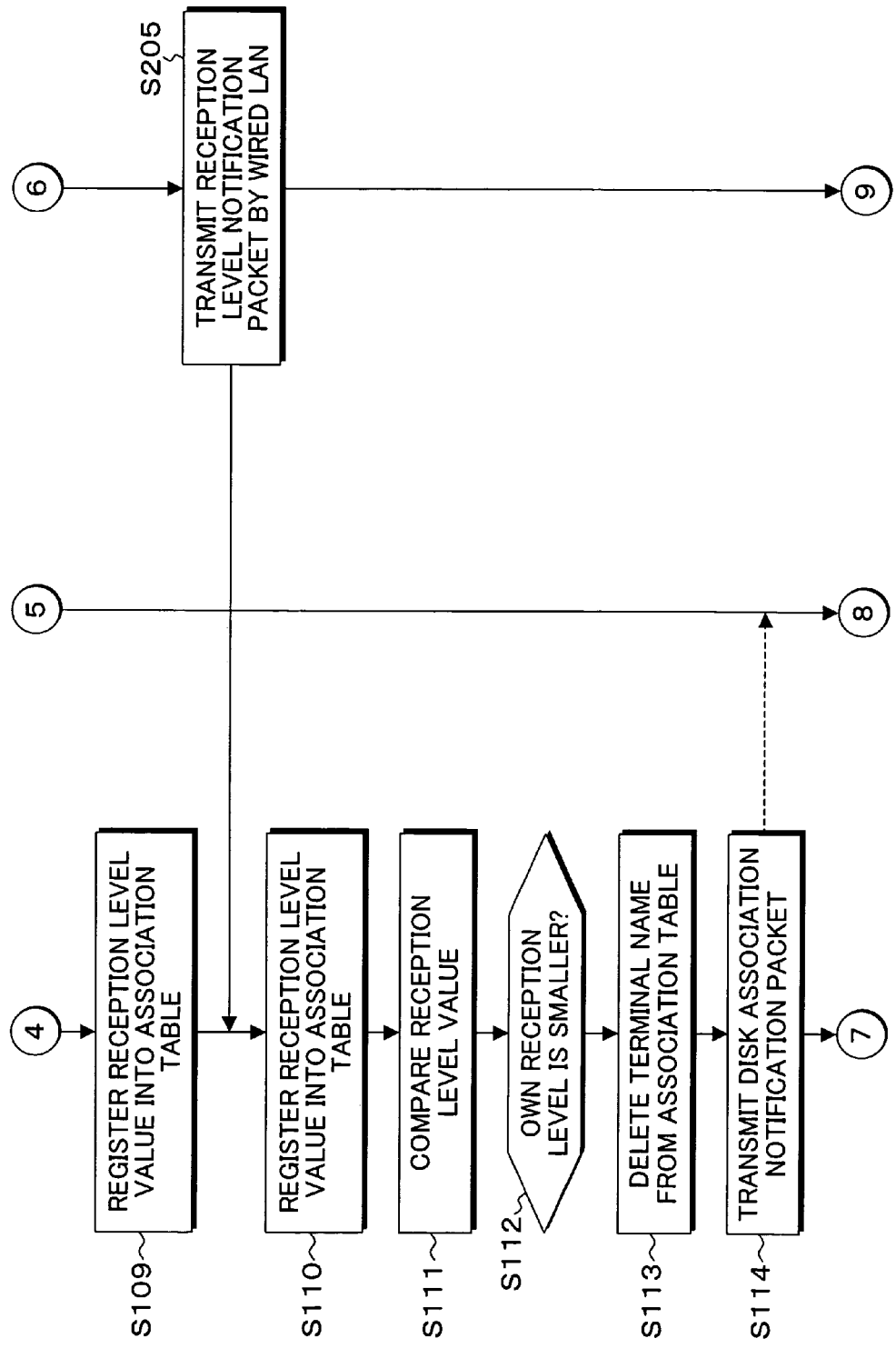

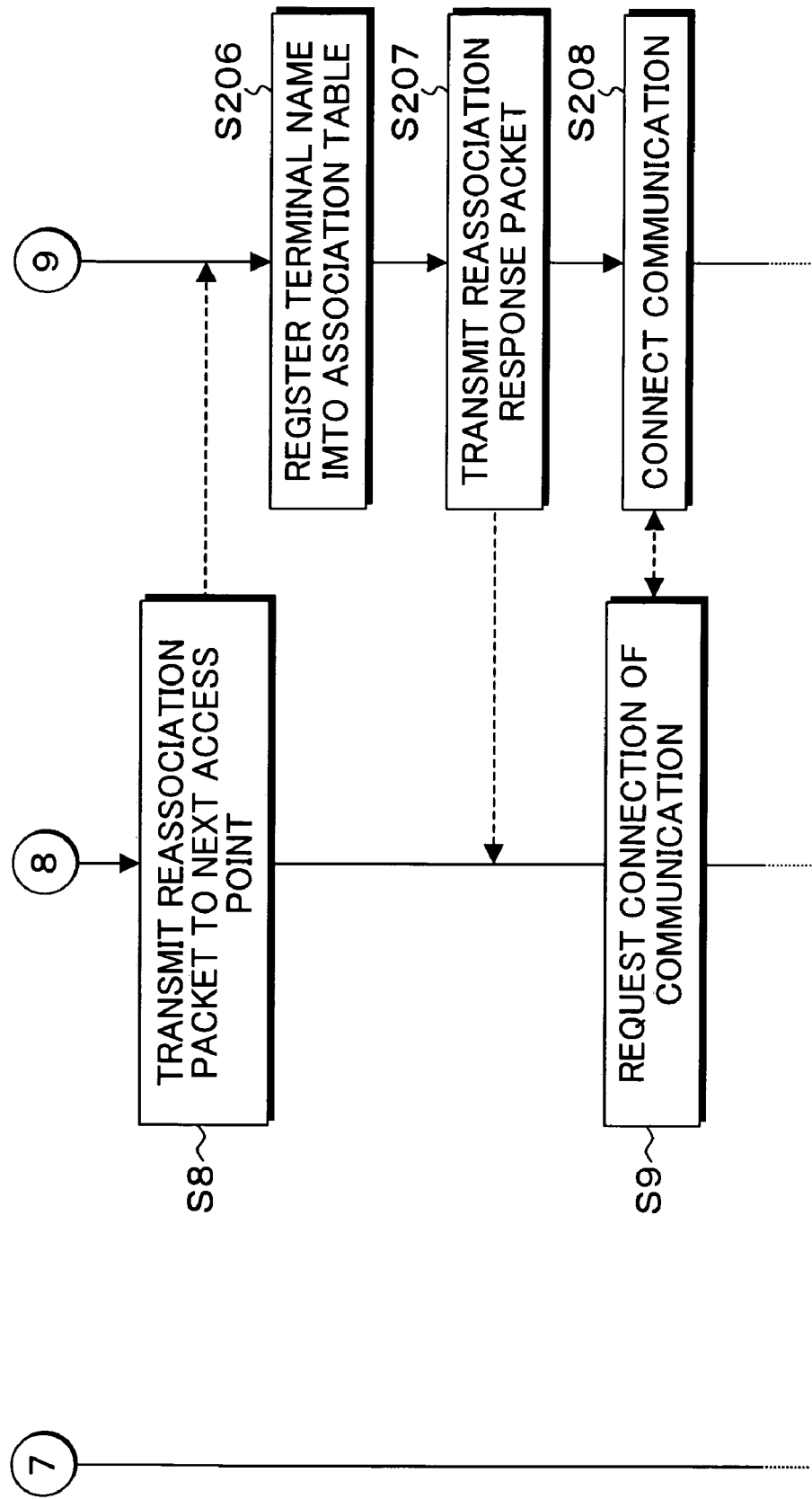

PROGRAM, RELAY APPARATUS CONTROL METHOD, WIRELESS COMMUNICATING APPARATUS CONTROL METHOD, AND SYSTEM

CROSS-REFERENCE TO RELATED APPLICATION

The present application claims priority from Japanese Application number 2004-246601 filed on Aug. 26, 2004, which is herein incorporated by reference.

BACKGROUND OF THE INVENTION

1. Field of the Invention

The invention relates to a program, a relay apparatus control method, a wireless communicating apparatus control method, and a system for connecting to an optimum access point which is fixedly placed in association with movement of a terminal and, more particularly, to a program, a relay apparatus control method, a wireless communicating apparatus control method, and a system for switching connection to an access point of optimum communicating conditions in the case where a terminal is positioned in a communication possible range where a plurality of access points are overlapped.

2. Description of the Related Arts

Hitherto, a wireless LAN has been known as a LAN which does not use a wired cable and the wireless LAN which conforms with IEEE802.11 has been widespread. The following three standards can be given as existing wireless LANs which conform with IEEE802.11: IEEE802.11b; IEEE802.11g; and IEEE802.11a. In IEEE802.11b, a radio wave of a band of 2.4 GHz is used, a spread spectrum communication system is used as a communication system, and a maximum transfer speed of 11 Mbps is realized. Likewise, in IEEE802.11g, a radio wave of a band of 2.4 GHz is used, an orthogonal frequency multiplex division system is used as a communication system, and a maximum transfer speed of 54 Mbps is realized. Further, in IEEE802.11a, a radio wave of a band of 5 GHz is used, the orthogonal frequency multiplex division system is used as a communication system, and a maximum transfer speed of 54 Mbps is realized.

In such a wireless LAN, a roaming technique is extremely important in the case where it is used in an infrastructure mode for connecting the wireless LAN to the wired LAN through an access point. The "roaming" is an operation for switching connection of a terminal in the case where the terminal moves out of a communication range of the access point to which the terminal is connected to at present into a communication range of another access point.

FIG. 1 shows an example of a fundamental construction of a conventional wireless LAN. Access points 100-1 and 100-2 of the wireless LAN have communication possible ranges 104-1 and 104-2 arranged so that placing positions can be covered without missing. Frequency channels for communicating have been preset into the access points 100-1 and 100-2. The available frequency channels have been predetermined every country and are as follows in Japan.

TABLE 1

[表 1]

| 規格 | 周波数範囲 | チャネル割当 |
|---|---|---|
| IEEE802.11a | 5.150 · 5.250 MHz | 20 MHz間隔で4チャネル使用可能 |
| IEEE802.11b | 2.400 · 2.497 MHz | 5 MHz間隔で14チャネル使用可能 |
| IEEE802.11c | 2.400 · 2.4835 MHz | 5 MHz間隔で13チャネル使用可能 |

(a) Standard
(b) Frequency range
(c) Channel allocation
(d) 4 channels can be used at an interval of 20 MHz
(e) 14 channels can be used at an interval of 5 MHz
(f) 13 channels can be used at an interval of 5 MHz In FIG. 1, terminals 102-1, 102-2, and 102-3 are connected to the access point 100-1, terminals 102-4 and 102-5 are connected to the access point 100-2, and the terminals 102-1 to 102-5 make communication in the areas of the communication possible ranges 104-1 and 104-2 where they are positioned at present, respectively. Different frequency channels are set into the access points 100-1 and 100-2 so that their mutual communication does not interfere with each other. In a CSMA/CA (Carrier Sense Multiple Access with Collision Avoidance) as a communication system of the wireless LAN, when the communication is started, in order to confirm that another access point and the terminal do not make communication, a non-communication time of a predetermined time is detected and, thereafter, the communication is made. Therefore, if an access point or a terminal using the same channel exist in the neighborhood, they obstruct the mutual communication. To avoid such a situation, an operating method whereby different channels are set and the occurrence of the interference is prevented is used.

In FIG. 1, how the terminal is connected to the access point and the communication is started will now be described with respect to the terminal 102-2 as an example. A communication starting operation in the wireless LAN is executed by an access point searching operation and an associating operation.

(Access Point Searching Operation)

First, the terminal 102-2 transmits a probe request packet to search whether or not a connectable access point exists near when a power source is turned on. The probe request packet is transmitted to all channels which can be used by the terminal 102-2. This is because the terminal does not previously know to which channel the access point has been set. Although the access points 100-1 and 100-2 use the different channels, since the probe request packet from the terminal 102-2 is transmitted by using all of the channels, the access points receive the probe request packets of their own channels. After that, as a response to the terminal 102-2, each of the access points 100-1 and 100-2 returns a probe response packet showing that they can be connected to the terminal 102-2 as a response to the terminal 102-2. The terminal 102-2 which received the probe response packets from the access points 100-1 and 100-2 determines to which one of the access points 100-1 and 100-2 it is connected. An algorithm for such determination differs every apparatus.

(Associating Operation)

For example, when the access point 100-1 is determined as an access point to be connected to, the terminal 102-2 transmits an association request packet to obtain permission of the connection to the access point 100-1. The access point 100-1 which received the association request packet from the terminal 102-2 registers a terminal whose connection is permitted into an internal association table. The association table is a management table to store information of the terminal whose connection has been permitted by the access point 100-1. This table is held in the access point. After completion of the registration of the terminal 102-2 into the association table, the access point 100-1 notifies the terminal 102-2 of the connection permission by an association response packet. The associating operation is completed. After that, the terminal 102-2 communicates with the access point 100-1.

(Roaming Operation)

The operation when the terminal 102-2 executes the roaming on the wireless LAN with the construction of FIG. 1 will now be described. The operation when the terminal 102-2 moves out of the communication possible range 104-1 of the access point 100-1 which was registered first and the connection is restarted in the communication possible range 104-2 of the access point 100-2 is shown in FIG. 2.

First, it is assumed that a terminal 102-2" moved like a terminal 102-2' to the outside of the communication possible range 104-1 of the access point 100-1. Since the communication with the access point 100-1 connected to becomes impossible here, the terminal 102-2' executes the operation to search for a new access point. Although this operation is the same as the access point searching operation described in FIG. 1, since the access point with which the communication can be made does not exist in this location, the transmission of the probe request packet is repeated until the probe response packet is returned. Subsequently, the terminal 102-2 continues to move and reaches the inside of the communication possible range 104-2 of the access point 100-2. The probe request packet from the terminal 102-2 is successively transmitted. Since the access point 100-2 exists at this point of time, the access point 100-2 which received the probe request packet returns the probe response packet. The terminal 102-2 determines the connection to the access point 100-2 and the access point searching operation is completed.

At this point of time, although the terminal 102-2 has determined the access point 100-2 to be connected to next, the association table of the access point 100-1 connected to before is not changed but keeps the contents that the terminal 102-2 has been registered. Therefore, the terminal 102-2 cannot make communication yet. Therefore, a reassociating operation is executed to update the association tables of the access points 100-1 and 100-2. In the reassociating operation, together with the making of the association table of the access point 100-2 to be newly connected to, a process for deleting the registration of the terminal which moved out of the association table of the access point 100-1 which has been connected to before is also executed.

The reassociating operation will now be described. The terminal 102-2 transmits a reassociation request packet to newly register the connection to the access point 100-2. Switching source access point information as information of the access point 100-1 to which the terminal had been connected is included in the reassociation request packet. The access point 100-2 which received the reassociation request packet from the terminal 102-2 additionally registers the terminal 102-2 into its own association table and instructs the access point 100-1, through a wired LAN 106, to which the terminal 102-2 had been connected to delete the terminal 102-2 from the association table. The access point 100-1 receives the deleting instruction from the association table of the terminal 102-2 from the access point 100-2 and deletes the terminal 102-2 from its own association table. By transmitting a reassociation response packet, the access point 100-2 notifies the terminal 102-2 that the reassociating operation has been completed. The terminal 102-2 receives the reassociation response packet and completes the reassociating operation. The roaming operation is completed in this manner. After that, the terminal 102-2 communicates with the access point 100-2.

However, according to the conventional roaming in the wireless LAN, there are the following problems.

FIG. 3 shows a case where a problem occurs in the conventional roaming operation. In the construction of the wireless LAN, an overlap of the communication possible ranges 104-1 and 104-2 of the access points 100-1 and 100-2 is large. Such an environment can occur in the case where a transmission electric power and receiving sensitivity of each of the access points 100-1 and 100-2 are large and their communication ranges are large, in the case where the positions of the access points 100-1 and 100-2 are close, or the like. Association situations of the access points 100-1 and 100-2 and the association tables are similar to those in FIG. 1. The terminal 102-2 is initially located in the position of the terminal 102-2'. It is assumed that the terminal 102-2 moved near to the access point 100-2 in such a state. However, since the terminal 102-2 still remains in the communication possible range 104-1 of the access point 100-1, it does not execute the roaming operation but continues to communicate with the access point 100-1.

Considering the positional relation of the terminal 102-2, in spite of the fact that the terminal 102-2 is near the access point 100-2, the communication is made with the access point 100-1. The problem in this case is that communication quality of the wireless LAN is largely influenced by the distance. When the distance is short, the communication quality is hardly influenced by other radio waves or obstacles and performance is high. However, when the distance is long, the performance contrarily deteriorates. Therefore, when the terminal 102-2 moves near to another access point 100-2, even if it is within the communication possible range 104-1 of the access point 100-1 connected to at present, communicating with the access point 100-2 which is near would improve the performance. However, such a communication construction is impossible in the conventional roaming operation.

As mentioned above, in the conventional roaming operation, even when the access point of the high communication quality exists near, switching of the access point is impossible and the terminal can communicate only with the access point of the inferior communication quality.

The roaming system of the wireless LAN disclosed in JP-A-09-083545 has been made on the assumption that all channels (communicating frequencies) of the adjacent access points are the same. The terminal in JP-A-09-083545 detects the access points by receiving a beacon. The beacon is a packet which is periodically transmitted from the access point to the terminal and transmitted by the channel which has been preset in the access point.

The terminal receives the beacons from a plurality of access points and measures intensity of the radio wave during the communication. However, this method can be realized because all of the access points use the same frequency channel. If a different frequency channel is set every access point, the terminal cannot receive the beacons of the adjacent access points. In the wireless LAN in which the different frequency channel is set every access point as shown in FIGS. 1 to 3, the roaming operation according to JP-A-09-083545 cannot be executed.

SUMMARY OF THE INVENTION

According to the invention, there are provided a program, a relay apparatus control method, a wireless communicating apparatus control method, and a system which enable roaming for switching connection of a terminal to an access point in which optimum communication quality can be obtained even in the case where different channels have been set to adjacent access points.

(Program for a Relay Apparatus)

The invention provides a program for roaming of a wireless LAN. The program according to the invention allows a relay apparatus which functions as an access point 10 for relaying wireless communication by a wireless communicating apparatus which functions as a terminal 12 on a wireless network to execute:

a detecting step wherein measurement information transmitted from the wireless communicating apparatus is received, a reception level value is detected, in the case of the measurement information from the wireless communicating apparatus which has been notified of connection permission, the reception level value is managed, in the case of the measurement information from the wireless communicating apparatus which is not notified of the connection permission, the reception level value is notified to another relay apparatus which has been notified of the connection permission, and the reception level value notified from such another relay apparatus is further managed; and a switching instructing step wherein the reception level value of the wireless communicating apparatus which has been notified of the connection permission by the own relay apparatus is compared with the reception level value from such another relay apparatus, when the reception level value from such another relay apparatus exceeds the own reception level value, the connection permission to the wireless communicating apparatus is cancelled, and switching to such another relay apparatus is notified.

A communication possible range of the relay apparatus and that of such another relay apparatus mutually overlap and different channels are set in the relay apparatus and the wireless communicating apparatus can connect the communication by using all of the channels set in the relay apparatus.

In the detecting step, confirmation information transmitted from the wireless communicating apparatus is received and the reception level value is detected, in the case of the confirmation information from the wireless communicating apparatus which has been notified of the connection permission, the reception level value is registered into a management table 60-1, in the case of the confirmation information from the wireless communicating apparatus which is not notified of the connection permission, the reception level value is notified through a wired network to such another relay apparatus which has been notified of the connection permission, and the reception level value notified from such another relay apparatus through the wired network is further registered into the management table 60-1, and in the switching instructing step, the own reception level value registered in the management table 60-1 is compared with the reception level value of such another relay apparatus, if the reception level value of such another relay apparatus exceeds the own reception level value, the connection permission is cancelled by deleting identification information of the wireless communicating apparatus from the management table 60-1, and notification information to notify the wireless communicating apparatus of the switching to such another relay apparatus is transmitted.

Prior to the detecting step and the switching instructing step, the program of the invention allows the relay apparatus to execute:

a search response step wherein when request information to search for the communication possible relay apparatus is received in association with turn-on of a power source of the wireless communicating apparatus, response information showing that the communication is possible is transmitted; and a response step wherein when request information to obtain the connection permission is received from the wireless communicating apparatus, the identification information of the wireless communicating apparatus is registered into the management table 60-1 and response information showing the connection permission is transmitted. The wireless communicating apparatus periodically transmits the measurement information.

(Terminal Program for a Wireless LAN)

The invention provides a program which is executed by a wireless communicating apparatus which functions as a terminal 12. The program according to the invention allows the wireless communicating apparatus of a wireless network for selecting and connecting an optimum one of a plurality of relay apparatuses to execute:

a transmitting step wherein measurement information to confirm a reception level value is transmitted to the relay apparatus existing in a communication possible range; and a switching control step wherein when a switching notification to switch from the relay apparatus which has issued a connection permission notification to the next relay apparatus is received, communication connection is requested to the next relay apparatus and a permission response is received, thereby switching to the communication connection to the next relay apparatus.

The communication possible range of the relay apparatus and those of the other relay apparatuses mutually overlap and different channels are set in the relay apparatus and the wireless communicating apparatus can connect the communication by using all of the channels set in the relay apparatuses.

In the program of the invention, in the transmitting step, a list 70-1 on which identification information of the communication possible relay apparatuses and the channels have been registered by the searching operation at the time of turn-on of a power source is provided, and confirmation information to detect the reception level value is transmitted to the relay apparatuses registered on the list 70-1, and in the switching control step, when the switching notification to switch from the relay apparatus which has issued a connection permission notification to the relay apparatus which is connected to next is received, request information to request the communication connection is transmitted to the relay apparatus as a next connection destination and response information showing connection permission is received, thereby switching to the communication connection to the next relay apparatus.

Prior to the transmitting step and the switching control step, the program of the invention allows the wireless communication apparatus to execute:

a searching step wherein request information to obtain use permission to all channels set in a plurality of relay apparatuses is transmitted at the time of the turn-on of the power source of the wireless communicating apparatus, and when response information showing that the communication is possible is received from the relay apparatus, identification information and the channel of the relay apparatus are registered onto the list 70-1; and a requesting step wherein a specific relay apparatus is selected from the plurality of relay apparatuses which have transmitted the response information, the request information to obtain the connection permission is transmitted, the response information showing the connection permission is received from the relay apparatus as a transmission destination, and the communication connecting operation is started.

(Relay Apparatus Control Method)

The invention provides a relay apparatus control method of a wireless network for selecting and connecting an optimum one of a plurality of relay apparatuses in association with movement of a wireless communicating apparatus. The relay apparatus control method of the invention comprises:

a detecting step wherein measurement information transmitted from the wireless communicating apparatus is received, a reception level value is detected, in the case of the measurement information from the wireless communicating apparatus which has been notified of connection permission, the reception level value is managed, in the case of the measurement information from the wireless communicating apparatus which is not notified of the connection permission, the reception level value is notified to another relay apparatus which has been notified of the connection permission, and the reception level value notified from such another relay apparatus is further managed; and a switching instructing step wherein the reception level value of the wireless communicating apparatus which has been notified of the connection permission by the own relay apparatus is compared with the reception level value from such another relay apparatus, when the reception level value from such another relay apparatus exceeds the own reception level value, the connection permission to the wireless communicating apparatus is cancelled, and switching to such another relay apparatus is notified.

(Wireless Communicating Apparatus Control Method)

The invention provides a wireless communicating apparatus control method of a wireless network for selecting and connecting an optimum one of a plurality of relay apparatuses. The wireless communicating apparatus control method of the invention comprises:

a transmitting step wherein measurement information to confirm a reception level value is transmitted to the relay apparatus existing in a communication possible range; and a switching control step wherein when a switching notification to switch from the relay apparatus which has issued a connection permission notification to the next relay apparatus is received, communication connection is requested to the next relay apparatus and a permission response is received, thereby switching to the communication connection to the next relay apparatus.

(System)

The invention provides a system for selecting and connecting an optimum one of a plurality of relay apparatuses in association with movement of a wireless communicating apparatus. In the system of the invention, the relay apparatus comprises:

a detecting unit (reception level detecting unit 62) which receives measurement information transmitted from the wireless communicating apparatus, detects a reception level value, in the case of the measurement information from the wireless communicating apparatus which has been notified of connection permission, manages the reception level value, in the case of the measurement information from the wireless communicating apparatus which is not notified of the connection permission, notifies the reception level value to another relay apparatus which has been notified of the connection permission, and further manages the reception level value notified from such another relay apparatus; and a switching instructing unit (access point switching instructing unit 64) which compares the reception level value of the wireless communicating apparatus which has been notified of the connection permission by the own relay apparatus with the reception level value of such another relay apparatus, when the reception level value of such another relay apparatus exceeds the own reception level value, cancels the connection permission to the wireless communicating apparatus, and notifies such another relay apparatus of the switching to such another relay apparatus, and the wireless communicating apparatus comprises:

a transmitting unit (measurement packet transmitting unit 72) which transmits measurement information to confirm a reception level value to the relay apparatus existing in a communication possible range; and a switching control unit (access point switching control unit 74) which, when a switching notification to switch from the relay apparatus which has issued a connection permission notification to the next relay apparatus is received, requests communication connection to the next relay apparatus and receives a permission response, thereby switching to the communication connection to the next relay apparatus.

(Relay Apparatus)

The invention provides a relay apparatus of a wireless network. The relay apparatus of the invention comprises:

a detecting unit which receives measurement information transmitted from the wireless communicating apparatus, detects a reception level value, in the case of the measurement information from the wireless communicating apparatus which has been notified of connection permission, manages the reception level value, in the case of the measurement information from the wireless communicating apparatus which is not notified of the connection permission, notifies the reception level value to another relay apparatus which has been notified of the connection permission, and further manages the reception level value notified from such another relay apparatus; and a switching instructing unit (access point switching instructing unit 64) which compares the reception level value of the wireless communicating apparatus which has been notified of the connection permission by the own relay apparatus with the reception level value of such another relay apparatus, when the reception level value of such another relay apparatus exceeds the own reception level value, cancels the connection permission to the wireless communicating apparatus, and notifies next relay apparatus of the switching to the next relay apparatus.

(Wireless Communicating Apparatus)

The invention provides a wireless communicating apparatus of a wireless network for selecting and connecting an optimum one of a plurality of relay apparatuses. The wireless communicating apparatus of the invention comprises:

a transmitting unit which transmits measurement information to confirm a reception level value to the relay apparatus existing in a communication possible range; and a switching control unit which, when a switching notification to switch from the relay apparatus which has issued a connection permission notification to the next relay apparatus is received, requests communication connection to the next relay apparatus and receives a permission response, thereby switching to the communication connection to the next relay apparatus.

Details of the access point control method, terminal control method, system, access point, and terminal of the invention are fundamentally the same as those in the case of the programs for the relay apparatus and the wireless communicating apparatus according to the invention.

According to the invention, even in the constructional environment of the wireless LAN in that the access points serving as relay apparatuses in which the communication possible ranges overlap largely and the different channels have been set are arranged, the wireless terminal which functions as a wireless communicating apparatus transmits the reception level confirmation packet every predetermined time, detects the reception levels at the communication possible access points, collects them to the access point which is connected to at present, and compares them, so that a magnitude relation of the reception level values of the access points in association with the movement of the terminal can be grasped in a real-time manner. When the reception level value of another access point is larger than the own reception level value, the roaming operation for switching the connection of the terminal to such an access point is executed.

Therefore, even if the terminal is positioned in the communication possible range where a plurality of access points overlap, the roaming operation for switching to the nearest access point is always executed and the communication distance to the access point is always kept to the shortest distance, so that the high communication quality can be assured. Since the optimum access point is discriminated on the basis of the reception level at the access point, for example, even if the communication distance is short, the access point of the bad communicating conditions due to an obstacle or the like can be avoided. The roaming operation for maintaining the connection to the access point of the best communication quality can be always executed and the communication quality of the wireless LAN can be improved.

The above and other objects, features, and advantages of the present invention will become more apparent from the following detailed description with reference to the drawings.

BRIEF DESCRIPTION OF THE DRAWINGS

FIG. 9 is an explanatory diagram of an access point list provided for the terminal in FIG. 4;

FIGS. 10A to 10D are explanatory diagrams of an association table provided for an access point 10-1 in FIG. 4;

FIGS. 12A to 12C are explanatory diagrams of an association table provided for an access point 10-2 in FIG. 4;

FIGS. 13C and 13D are time charts for the roaming operation which are sequels to FIGS. 13A and 13B;

DETAILED DESCRIPTION OF THE PREFERRED EMBODIMENT

Figure 4:
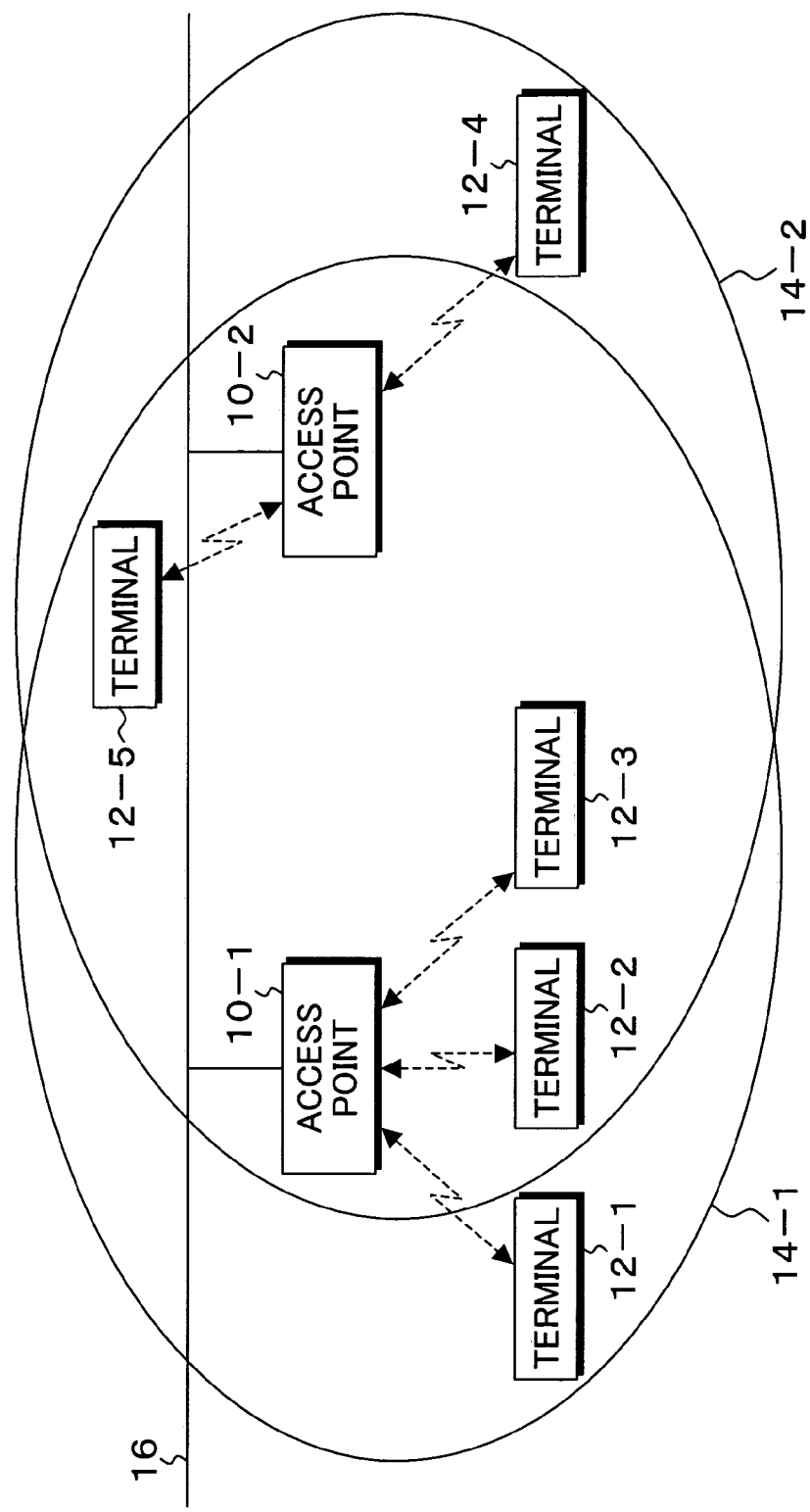
FIG. 4 is an explanatory diagram of a wireless LAN system to which the invention is applied.

FIG. 4 is an explanatory diagram of a wireless LAN system to which a roaming process of the invention is applied. There is the following correspondence relation between component elements in the following embodiment and those of Claims. That is, a LAN or a LAN line corresponds to a "network" in Claims; an access point corresponds to a "relay apparatus"; a terminal corresponds to a "wireless communicating apparatus"; a packet corresponds to "information"; an association table corresponds to a "management table"; and an access point list corresponds to a "list". The correspondence to Claims is shown in the parentheses ( ) as necessary.

In FIG. 4, for example, access points 10-1 and 10-2 are fixedly provided for a wireless LAN system. A communication possible range 14-1 of the access point 10-1 and a communication possible range 14-2 of the access point 10-2 overlap largely. The access points 10-1 and 10-2 are connected to a wired LAN 16. Terminals 12-1 to 12-5 exist in the communication possible areas 14-1 and 14-2 of the access points 10-1 and 10-2. The terminals 12-1, 12-2, and 12-3 among them are connected to the access point 10-1 by a wireless LAN and communicate with one another and the terminals 12-4 and 12-5 are connected to the access point 10-2 by a wireless LAN and communicate with each other. Different channels have been set into the access points 10-1 and 10-2. For example, a channel CH1 is set into the access point 10-1 and a channel CH2 is set into the access point 10-2. The terminals 12-2 to 12-4 can use all channels which can be set onto the side of the access points. For example, in the case of IEEE802.11a, they can use all of four channels CH1, CH2, CH3, and CH4.

Figure 5:
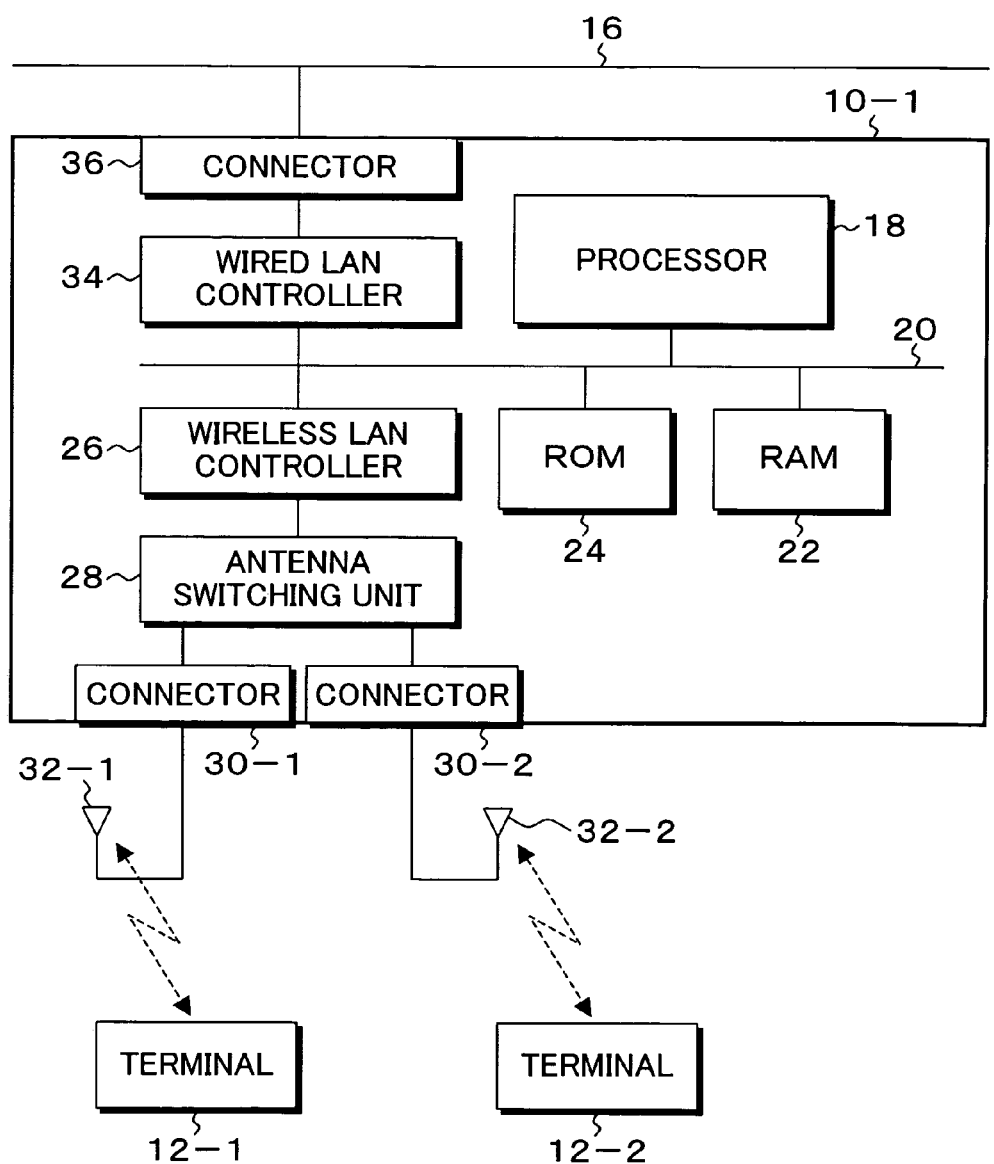
FIG. 5 is a block diagram of an apparatus construction of the access point in FIG. 4.

FIG. 5 is a block diagram of an apparatus construction of the access point 10-1 in FIG. 4. In FIG. 5, a processor 18 is provided for the access point 10-1. A RAM 22, a ROM 24, a wireless LAN controller 26, and a wired LAN controller 34 are connected to the processor 18 through a bus 20. Antennas 32-1 and 32-2 are connected to the wireless LAN controller 26 through an antenna switching unit 28 by connectors 30-1 and 30-2. The wired LAN controller 34 is connected to the wired LAN 16 through a connector 36.

The wireless LAN controller 26 has processing functions of the access point side which are necessary for a roaming process of the invention. The wireless LAN controller 26 constructs a wireless LAN physical layer, a wireless LAN MAC layer, and an upper layer in accordance with IEEE802.11 and makes wireless communication according to CSMA/CA (Carrier Sense Multiple Access with Collision Avoidance). A channel adaptor 10-1 performs a relay between, for example, the terminals 12-1 and 12-1 existing in the communication possible range by the wireless LAN or a relay between the terminals 12-1 and 12-1 and terminals (not shown) connected to the wired LAN 16 side.

In this wireless LAN, a signal which is multiplexed to a radio wave is approximate to an Ethernet frame of the wired Ethernet and it is ordinarily called an MAC frame and has a frame structure in which information peculiar to a radio has been added to the wired Ethernet frame. MAC addresses possessed by network adaptors of a transmitting source and a partner destination have been described in a head of the MAC frame. In the relaying operation of the access point 10-1, a destination MAC address of the Ethernet frame received by the wireless LAN controller 26 is checked and, if the partner exists on the wireless LAN, a packet is inputted into a wireless Ethernet frame again and the signal is relayed. If the partner exists on the wired LAN 16, the packet is inputted into the wired Ethernet frame again and the signal is relayed.

Figure 6:
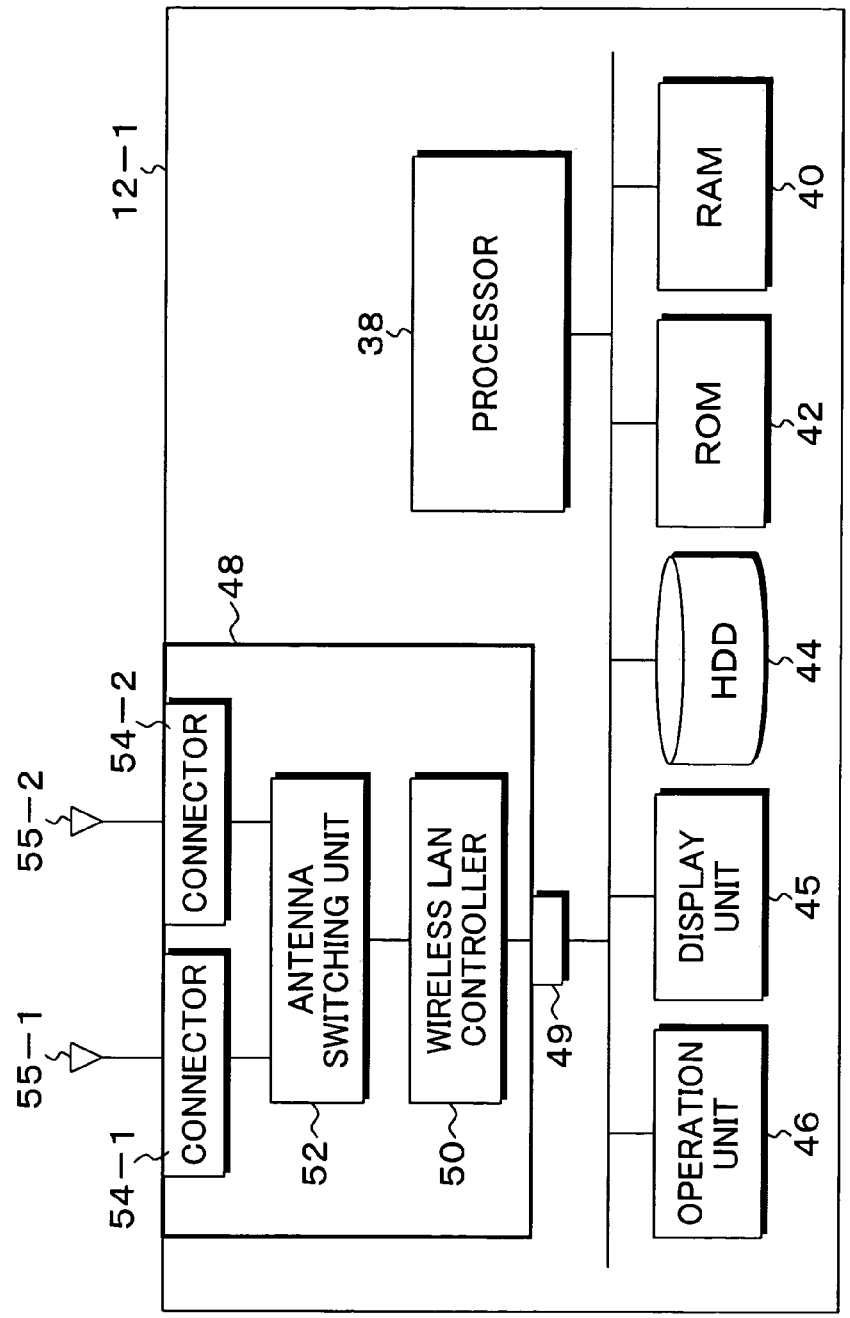
FIG. 6 is a block diagram of an apparatus construction of a terminal in FIG. 4.

FIG. 6 is a block diagram of an apparatus construction of the terminal 12-1 in FIG. 4 and an example in which a personal computer is used as a terminal apparatus is shown. A processor 38 is provided for the terminal apparatus 12-1 in FIG. 6. A RAM 40, a ROM 42, a hard disk drive (HDD) 44, a display unit 45, and an operation unit 46 are connected to the processor 38 through a bus. Further, a wireless LAN card 48 is attached into a card slot 49. The wireless LAN card 48 has antennas 55-1 and 55-2 through a wireless LAN controller 50, an antenna switching unit 52, and connectors 54-1 and 54-2. Functions of the terminal side which are necessary for the roaming process of the invention is provided for the wireless LAN controller 50 of the wireless LAN card 48.

Figure 1:
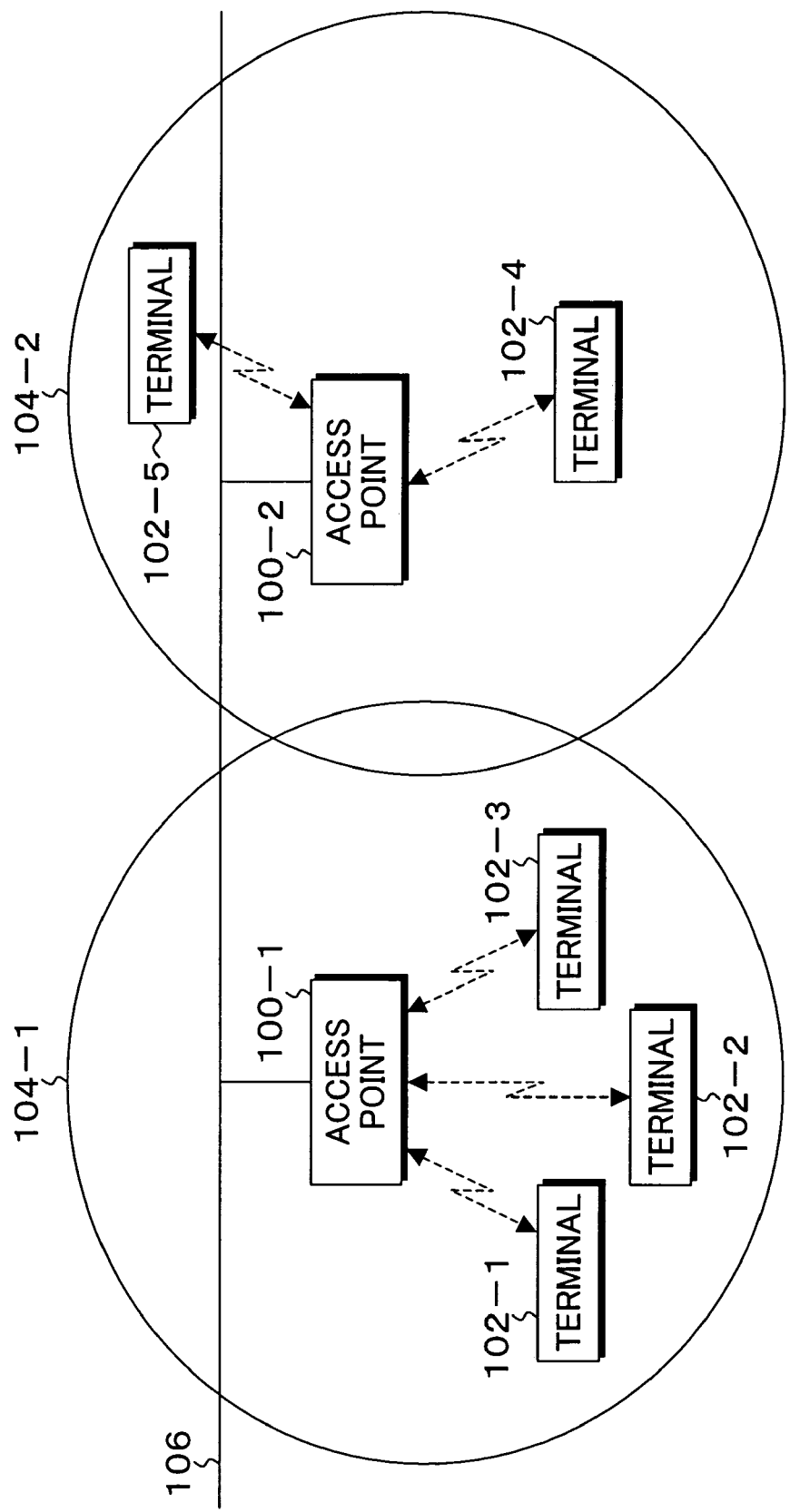
FIG. 1 is an explanatory diagram of the access point searching operation and the associating operation in a conventional wireless LAN.
Figure 2:
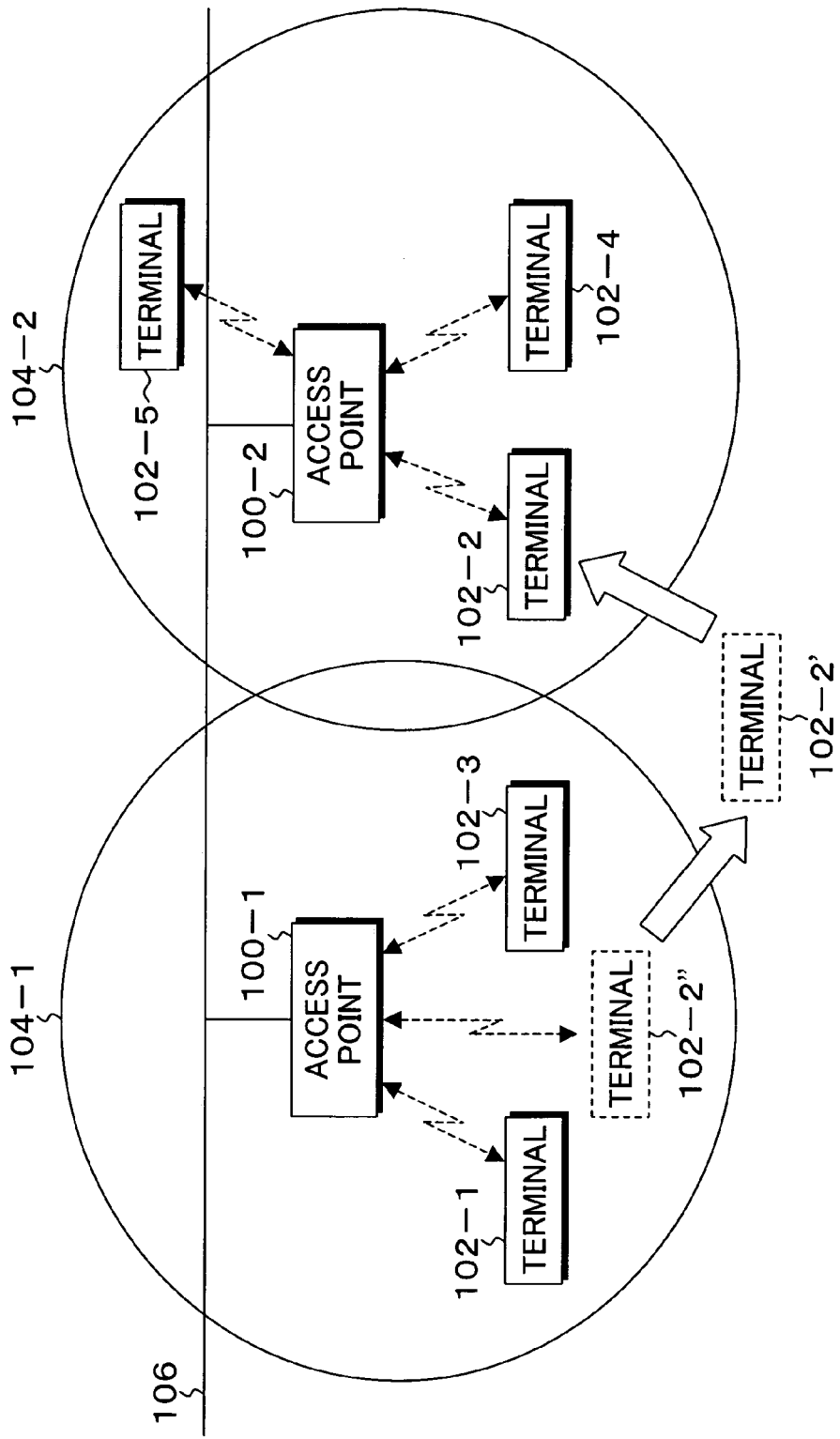
FIG. 2 is an explanatory diagram of the roaming operation in the conventional wireless LAN.
Figure 3:
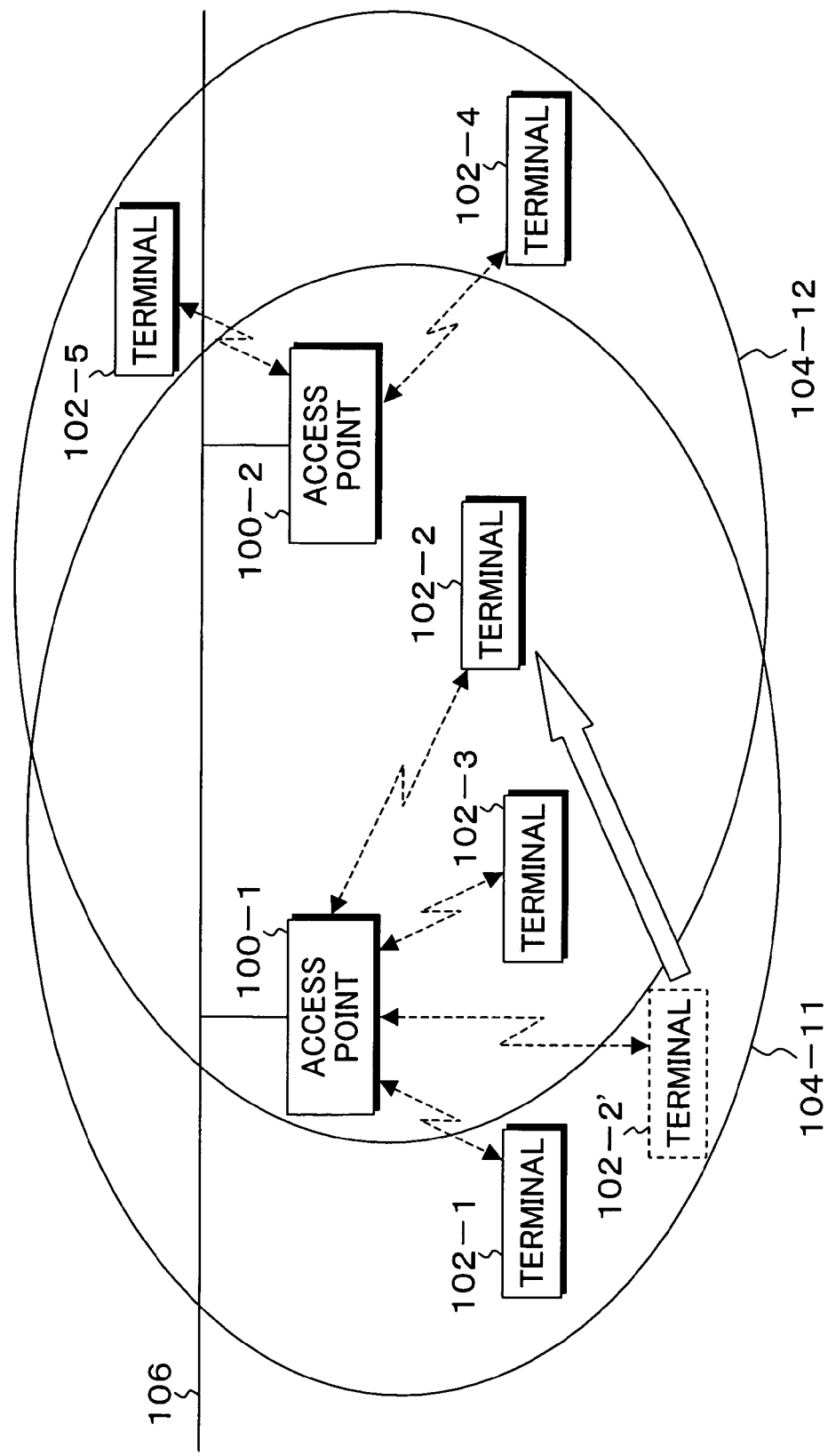
FIG. 3 is an explanatory diagram of a problem which occurs in the conventional roaming operation in the case where communication possible ranges of access points overlap largely.
Figure 7:
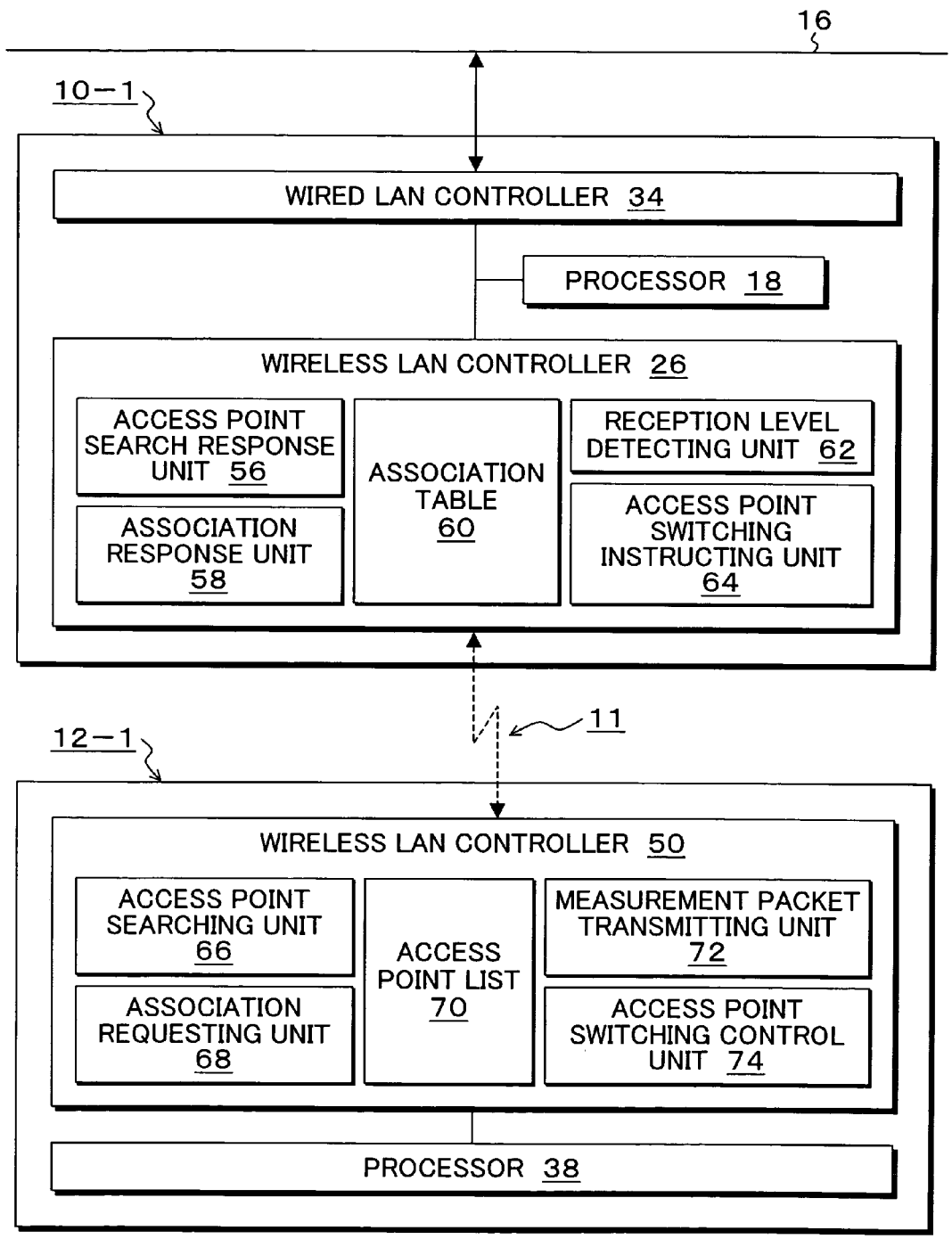
FIG. 7 is a block diagram of a functional construction of the access point and the terminal according to the invention in FIG. 4.

FIG. 7 is a block diagram of a functional construction of the access point and the terminal according to the invention and an example of the access point 10-1 and the terminal 12-1 is shown here. In FIG. 7, as functions of the access point side for realizing the roaming process according to the invention, an access point search response unit (search response unit) 56, an association response unit (response unit) 58, an association table 60, a reception level detecting unit (detecting unit) 62, and an access point switching instructing unit (switching instructing unit) 64 are provided for the wireless LAN controller 26 of the access point 10-1. The access point search response unit 56 and the association response unit 58 among them execute the access point searching operation in the conventional access point shown in FIG. 1 and the associating operation based on it. Therefore, the reception level detecting unit 62 and the access point switching instructing unit 64 handle the processing functions necessary on the access point side in the roaming process of the invention.

On the other hand, an access point searching unit (searching unit) 66, an association requesting unit (requesting unit) 68, an access point list 70, a measurement packet transmitting unit (transmitting unit) 72, and an access point switching control unit (switching control unit) 74 are provided for the wireless LAN controller 50 of the terminal 12-1. The access point searching unit 66 and the association requesting unit 68 among them realize the processing functions of the terminal side of the conventional the access point searching operation and the associating operation shown in FIG. 1. Therefore, the measurement packet transmitting unit 72 and the access point switching control unit 74 handle the functions on the terminal side in the roaming process of the invention.

The functions of the access point 10-1 side will now be described hereinbelow. When a probe request packet to search for the communication possible access point is received in association with the turn-on of a power source of the terminal 12-1, the access point search response unit 56 transmits a probe response packet showing that the communication is possible. When an association request packet to obtain connection permission from the terminal 12-1 is received, the association response unit 58 registers a terminal name into the association table 60 which functions as a management table and, thereafter, transmits an association response packet showing the connection permission.

The reception level detecting unit 62 receives a reception level confirmation packet (measurement packet) periodically transmitted from the terminal 12-1, detects the reception level. In the case of the reception level confirmation packet from the terminal which has been registered in the association table 60 and notified of the connection permission, the reception level detecting unit 62 registers the detected reception level value into the association table 60. In the case of the reception level confirmation packet from the terminal which is not notified of the connection permission, another access point notified of the connection permission is notified of the reception level value by the reception level detecting unit 62 through the wired LAN 16 by a reception level notification packet. Further, when the reception level notification packet is received from another access point through the wired LAN 16, the reception level detecting unit 62 registers the received reception level into the association table 60.

The access point switching instructing unit 64 compares the own reception level value registered in the association table 60 with the reception level value notified from another access point. When the reception level value notified from another access point exceeds the own reception level value, it is determined that the switching of the access point is necessary. The access point switching instructing unit 64 cancels the connection permission by deleting the name of the terminal which is connected to at present from the association table 60 and transmits a disassociation notification packet for notifying the terminal of the switching of the access point to be connected to next.

The functions of the terminal 12-1 will be described hereinbelow. When the power source is turned on, the access point searching unit 66 transmits the probe request packet to obtain use permission to all channels set in a plurality of access points and, when the access point searching unit 66 receives the probe response packet showing communication permission from the access point, it registers the access point name and the channel into the access point list 70.

The association requesting unit 68 determines the specific access point from a plurality of access points which received the probe response packet, that is, from the access points registered in the access point list 70 by the access point searching unit 66, transmits the association request packet to obtain the connection permission, receives association response packet showing the connection permission from the access point of the transmission destination, and starts the communication connecting operation. The measurement packet transmitting unit 72 transmits the reception level confirmation packet (measurement packet) to detect the reception level value every predetermined time to the communication possible access point registered in the access point list 70. When the disassociation notification packet as a notification of the switching from the access point which received the connection permission to the access point to be connected to next is received, the access point switching control unit 74 transmits a reassociation request packet for requesting the communication connection to the next access point and receives a reassociation response packet showing the connection permission, thereby executing the roaming to switch to the communication connection of the next access point.

Figure 8:
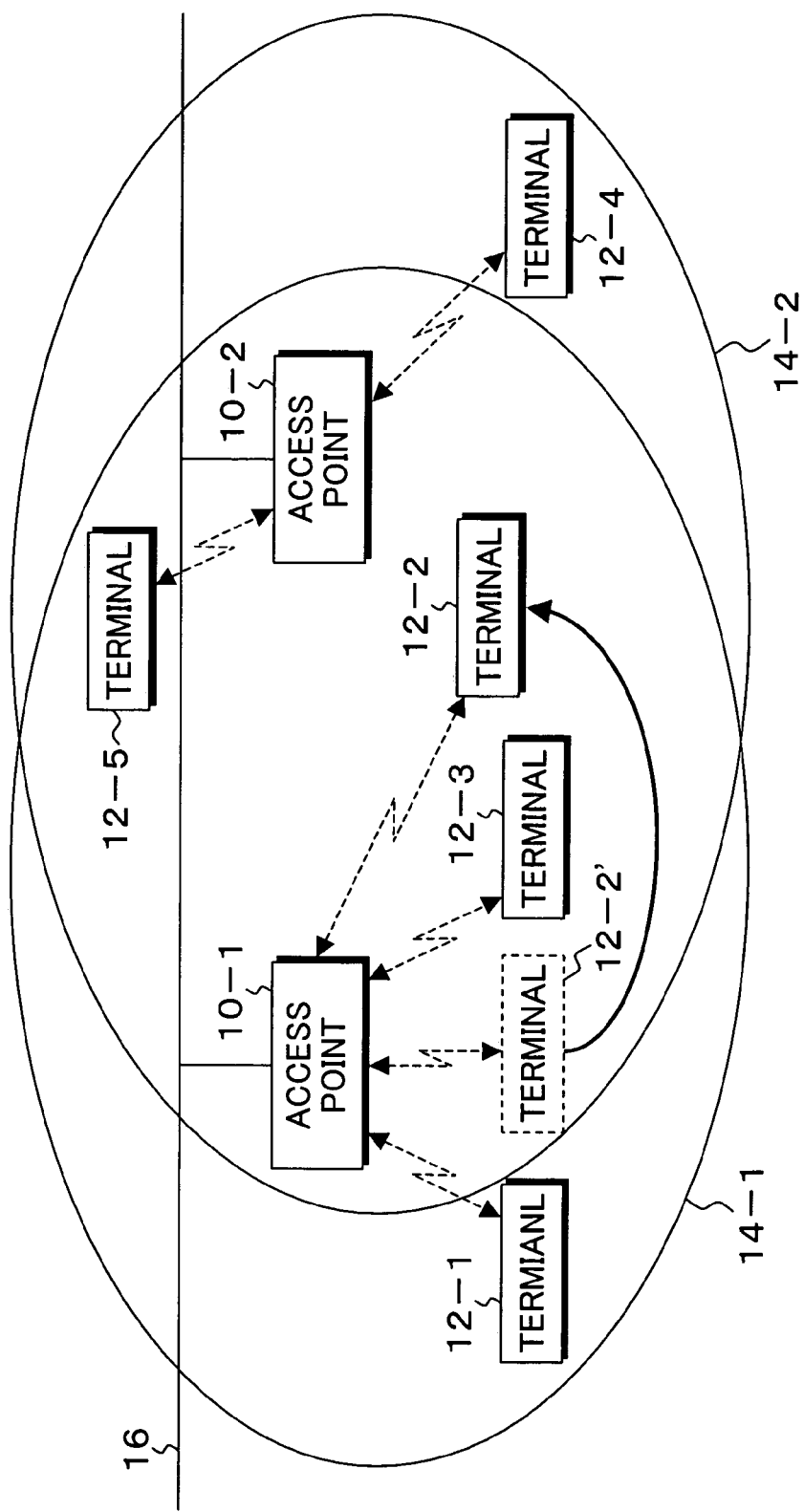
FIG. 8 is an explanatory diagram in the case where the terminal moved out of the state of FIG. 4 and the roaming operation is executed.

FIG. 8 is an explanatory diagram in the case where the terminal 12-2 moved out of the state of FIG. 4 and the roaming operation to switch from the connection of the access point 10-1 to the connection of the access point 10-2 is executed. The roaming process according to the invention will be described hereinbelow with respect to the movement of the terminal 12-2 in FIGS. 4 and 8 as an example.

FIG. 9 is an explanatory diagram of the access point list 70 provided for the terminal 12-2 in FIG. 4. In the terminal 12-2 in FIG. 4, the probe response packets are received from the access points 10-1 and 10-2 by the transmission using the channels 1 and 2 of the probe packet in association with the turn-on of the power source. Therefore, the access point names "AP10-1, AP10-2" of the access points 10-1 and 10-2 and their channel numbers CH1 and CH2 are registered in the access point list 70 in FIG. 9.

FIGS. 10A to 10D are explanatory diagrams of the association table provided for the access point 10-1 in FIG. 4. FIG. 10A shows a fundamental structure of an association table 60-1 of the access point 10-1. Terminal names DE12-1, DE12-2, and DE12-3 of the terminals 12-1, 12-2, and 12-3 whose communication was permitted through the access point searching operation and the associating operation are registered as terminal names in the association table 60-1. Further, own reception level values RL11, RL21, and RL31 in the access point 10-1 itself detected by receiving the reception level confirmation packets transmitted from the terminals 12-1 to 12-3 are stored. RL12, RL22, and RL32 as reception level values notified by receiving the reception level confirmation packets transmitted from the terminals 12-1 to 12-3 by using the channel CH2 in the access point 10-2 are also registered.

Specific registration contents in the state of FIG. 4 in the association table 60-1 in FIG. 10A are as shown in, for example, an association table 60-11 in FIG. 10B.

Figures 11A, 11B, 11C:
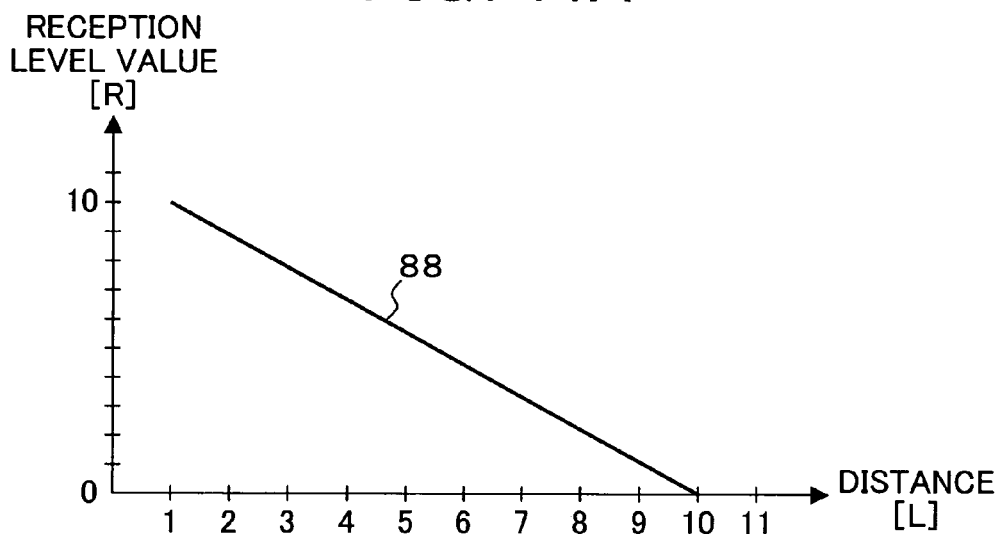
FIGS. 11A to 11C are explanatory diagrams showing a relation between a reception level value which is detected in reception level confirmation packets from the terminals of the invention and a distance.

FIGS. 11A to 11C are diagrams for explaining a relation between the reception level value and the distance in the case where the reception level confirmation packets are transmitted from the terminals 12-1 to 12-5 in FIG. 4 to the access points 10-1 and 10-2.

FIG. 11A is a graph showing characteristics in which an axis of abscissa indicates the distance (L) between each of the access points 10-1 and 10-2 in FIG. 4 and the terminal and an axis of ordinate indicates the reception level value (R) when the reception level confirmation packet transmitted from the terminal is received at each distance. The distance is shown by a numeral 1 to 11 in which 1L is set to one unit. The reception level value is shown by setting 1R to one unit. The relation of the reception level value to the distance in the case where the reception level confirmation packet from the terminal is received by the access point is a relation in which the reception level value is inversely proportional to the distance as shown by a characteristics straight line 88. That is, the shorter the distance is, the larger the reception level value is, and the longer the distance is, the smaller the reception level value is.

Therefore, by detecting the reception level value of the reception level confirmation packet transmitted from the terminal by the access point in the invention, the access point can presume the distance to the terminal.

FIG. 11B is a distance correspondence table 90-1 showing the relation, by a list, between the reception level value and the actual distance in the case where the reception level confirmation packet is received from each of the terminals 12-1 to 12-5 by the access point 10-1 in FIG. 4. FIG. 11C is an explanatory diagram of a distance correspondence table 90-2 showing the relation between the reception level value and the distance in the case where the reception level confirmation packets are received from the terminals 12-1 to 12-5 with respect to the access point 10-2 in FIG. 4. As will be obviously understood from the distance correspondence tables 90-1 and 90-2 that, between the distance and the reception level value, there is the correspondence relation in which the shorter the distance is, the larger the reception level is, and the longer the distance is, the smaller the reception level value is as shown in the characteristics straight line 88 in FIG. 11A.

As own reception level values detected by receiving the reception level confirmation packets from the terminals 12-1, 12-2, and 12-3 whose connection was permitted, reception level values 9R, 9R, and 7R of the terminal names DE12-1, DE12-2, and DE12-3 shown in the distance correspondence table 90-1 in FIG. 11B are stored as detection values in the association table 60-11 of the access point 10-2 in FIG. 10B. As reception level values of AP10-2 notified by being received in the access point 10-2 in the association table 60-11, reception level values 0R, 4R, and 6R obtained at the terminal names DE12-1 to DE12-3 in the distance correspondence table 90-2 in FIG. 11C are registered.

FIGS. 12A to 12C are explanatory diagrams of an association table 60-2 provided for the access point 10-2 in FIG. 4. FIG. 12A shows fundamental registration contents. FIG. 12B shows a registration example of the specific reception level values in the state of FIG. 4.

Also with respect to the association table 60-2 of the access point 10-2, as for fundamental contents of FIG. 12A, terminal names DE12-4 and DE12-5 have been registered in the case where the communication permission is issued through the access point searching operation and the associating operation between the terminals 12-4 and 12-5 in FIG. 4. RL42 and RL52 are registered as own reception level values as reception level values of the reception level confirmation packets from the terminals 12-4 and 12-5. Further, RL41 and RL51 are registered as reception level values of AP10-1 detected by the transmission of the reception level confirmation packets from the terminals 12-4 and 12-5 to the access point 10-1 and notified.

Specific contents of the association table 60-2 in FIG. 12A are as follows. In the case of FIG. 4, as shown in an association table 60-21 in FIG. 12B, from the contents of the distance correspondence tables 90-1 and 90-2 shown in FIGS. 11A to 11C, own reception level values regarding the terminal names DE12-4 and DE12-5 are equal to 4R and 9R and the reception level values of AP10-1 notified from the access point 10-1 are equal to 0R and 4R.

Contents of the association table 60-11 of the access point 10-1 shown in FIG. 10B and contents of the association table 60-21 of the access point 10-2 shown in FIG. 12B are as follows. As shown in FIG. 8, when the terminal 12-2 moves near to the access point 10-2 away from the access point 10-1, for example, the reception level value changes, for example, as shown in an association table 60-12 in FIG. 10C. In the association table 60-12, own reception level value corresponding to the terminal name DE12-2 of the terminal 12-2 decreases from the reception level value 9R so far to 5R because the terminal 12-2 is away from the access point 10-1. On the other hand, the reception level value of AP10-2 notified from the access point 10-2 increases from 4R so far to 9R.

With respect to the relation of the terminal name DE12-2 in the association table 60-12 of the access point 10-1, that is, when the reception level value of the access point 10-2 is larger than the own reception level value, this relation is compared and discriminated and the access point 10-1 which had given the connection permission determines that the switching to the next access point 10-2 is necessary. The access point 10-1 deletes the terminal name DE12-2 of the terminal 12-2 from the association table, cancels the connection permission, and transmits a disassociation notification packet shown in the contents to the moved terminal 12-2 in order to connect the terminal 12-2 to the next access point 10-2.

The terminal 12-2 which received the disassociation notification packet from the access point 10-1 confirms that the communication connection of the access point 10-2 has been finished and transmits a reassociation request packet to request the communication connection to the access point 10-2 as a next access point obtained by the packet contents. In response to the reassociation request packet, the access point 10-2 registers the terminal name DE12-2 of the terminal 12-2 as shown in an association table 60-22 in FIG. 12C, thereafter, transmits a reassociation response packet, and permits the connection to the terminal 12-2.

Although the reception level value at the stage when the terminal name DE12-2 of the terminal 12-2 in FIG. 12C was registered is equal to a default value 0R, if the reception level value is detected after that by the reception of the reception level confirmation packet from the terminal 12-2 whose connection has been permitted, for example, 9R is registered as an own reception level value and 5R is registered as a reception level value of AP10-1 notified from the access point 10-1 connected before. On the other hand, the association table of the access point 10-1 to which the terminal 12-2 has been connected before enters the state where the terminal name DE12-2 of the terminal 12-2 has been deleted as shown in FIG. 10D.

FIGS. 13A to 13D are time charts for the roaming operation according to the invention in the case where the terminal 12-2 moved as shown in FIG. 8 from the state of FIG. 4.

Figure 13A:
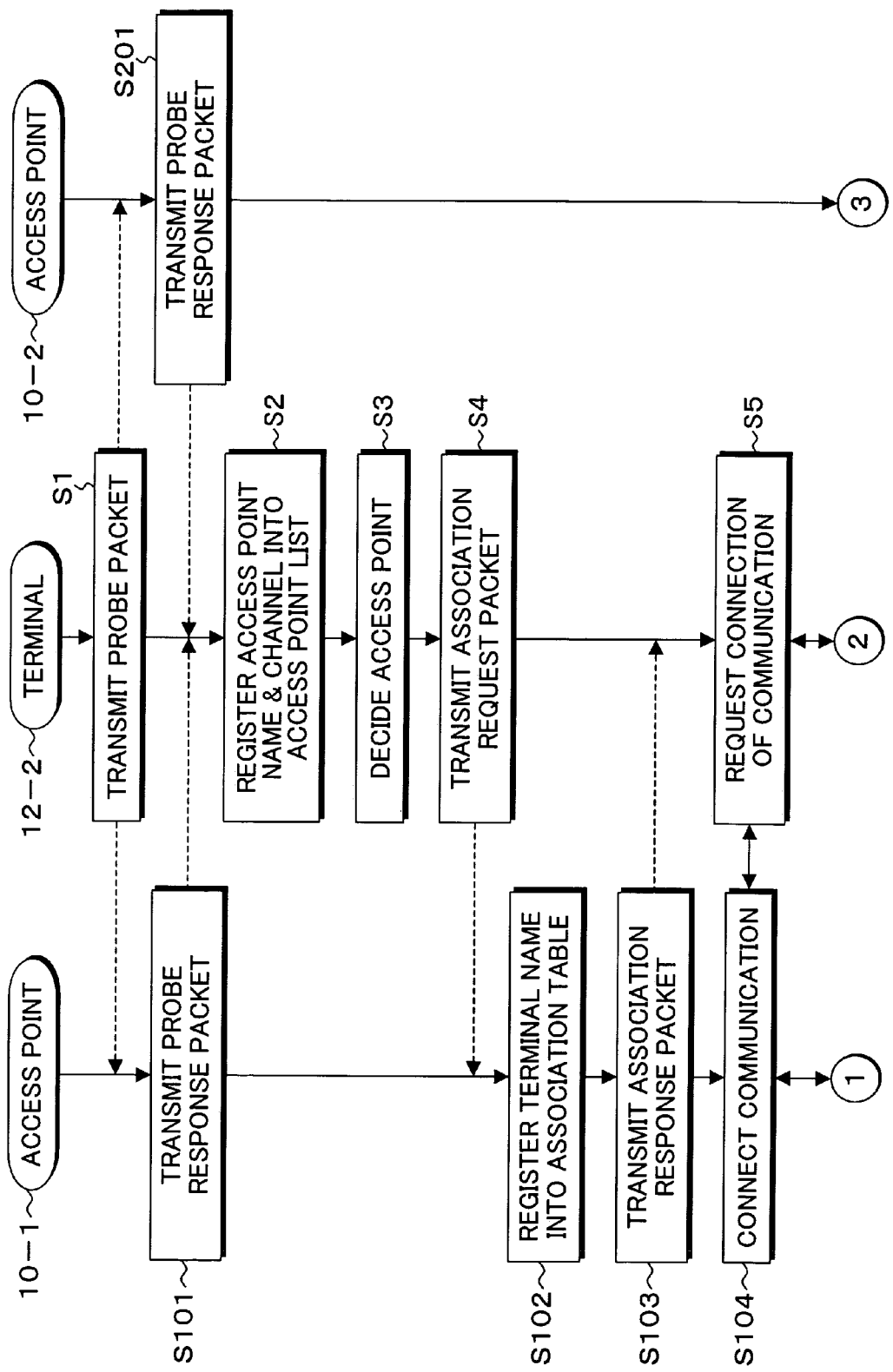
FIGS. 13A and 13B are time charts for the roaming operation according to the invention in the case where the terminal moved as shown in FIG. 8 from the state of FIG. 4.
Figure 13B:
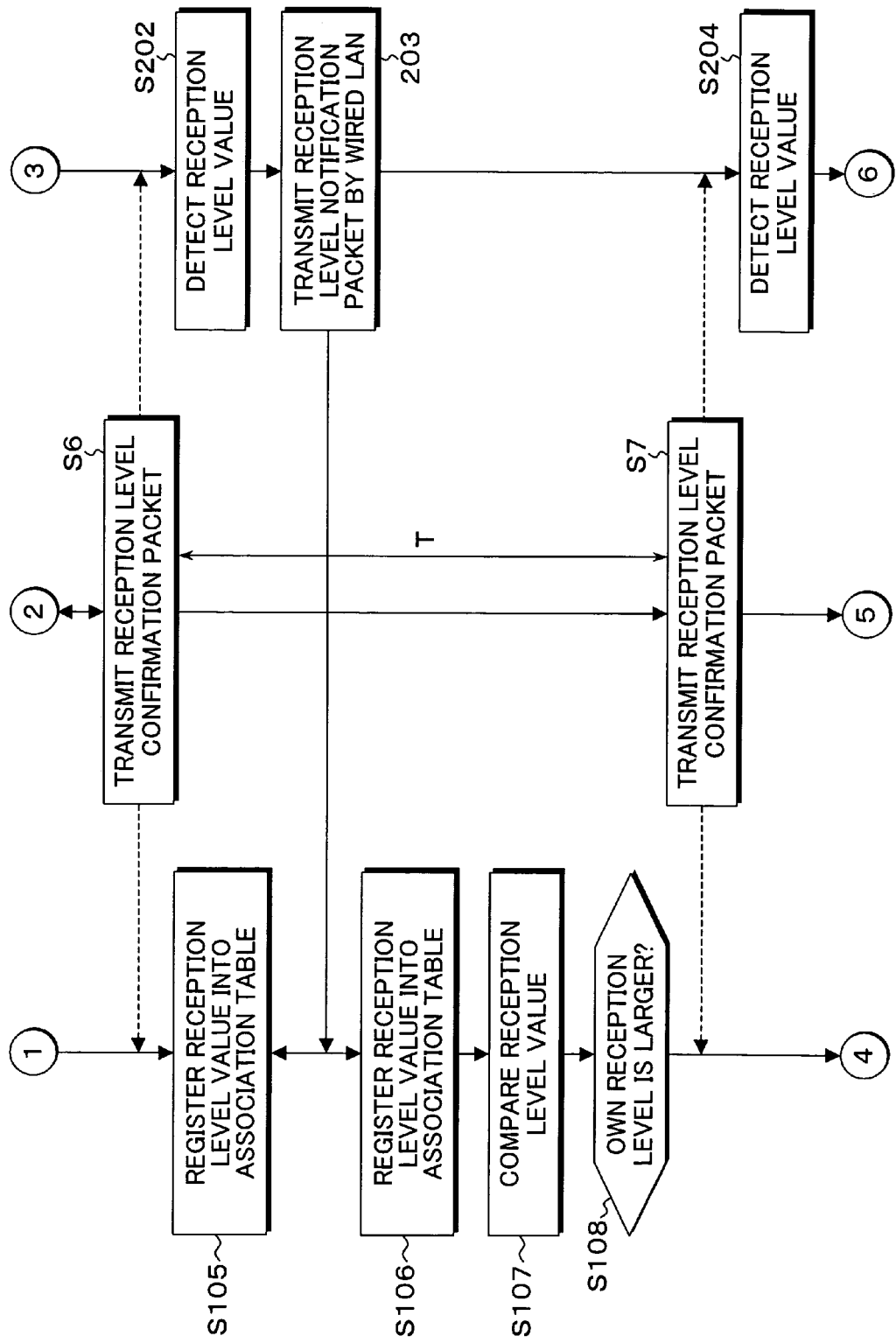

In FIGS. 13A and 13B, first, when the terminal 12-2 starts the operation by the turn-on of the power source at the position of FIG. 4, the probe packets are transmitted by using all channels of the channel numbers CH1 to CH4 in step S1. In response to the transmission of the probe packets, the access point 10-1 receives the probe packet of the channel CH1 and transmits the probe response packet showing that the communication is possible to the terminal 12-2 in step S101. Similarly, the access point 10-2 receives the probe packet in the channel CH2 and transmits the probe response packet showing that the communication is possible to the terminal 12-2 in step S201.

In step S2, the terminal 12-2 registers the access points AP10-1 and AP10-2 and their use channel numbers CH1 and CH2 as shown in the access point list 70 in FIG. 9 on the basis of the probe response packets received from the access points 10-1 and 10-2, respectively. Subsequently, the terminal 12-2 determines one of the registered two access points 10-1 and 10-2, for example, the access point 10-1 as a communication connection destination in step S3 and transmits the association packet to the access point 10-1 in order to obtain the connection permission.

The access point 10-1 receives an association request packet from the terminal 12-2 and registers the terminal name into the association table in step S102 and transmits an association response packet showing the connection permission to the terminal 12-2 in step S103. By this process, the terminal 12-2 obtains the communication connection permission from the access point 10-1 and requests the communication permission in step S5. The access point 10-1 connects the communication in step S104. The communication connection between the terminal 12-2 and the access point 10-1 by the wireless LAN is either the process in which the access point 10-1 relays the communication between the terminals or the process for relaying the communication from the terminal 12-2 to another terminal on the wired LAN 16.

When the access point searching operation and the associating operation of the terminal 12-2 are finished and the terminal enters the communicating state by the processes in steps S1 to S5, the terminal 12-2 transmits the reception level confirmation packet to the access points 10-1 and 10-2 by using the channels CH1 and CH2 in step S6, respectively.

When the access point 10-1 receives the reception level confirmation packet from the terminal 12-2, it refers to the association table 60-11 shown in FIG. 10B on the basis of the terminal name DE12-2 of the terminal 12-2 as a transmitting source, thereby confirming that it is the reception level confirmation packet to the own access point because the terminal name DE12-2 has been registered. As an own reception level value, the reception level value detected at that time by a reception level detecting circuit built in the wireless LAN controller 26 shown in FIG. 5, for example, the reception level value 9R is registered as an own reception level value in the association table 60-11.

In the access point 10-2, the reception level confirmation packet from the terminal 12-2 is received and, for example, the association table 60-21 in FIG. 12B is referred to on the basis of the terminal name DE12-2 as a receiving source. However, since the terminal name is not registered, it is determined not to be the reception level confirmation packet to the own access point. A reception level notification packet is transmitted to the access point 10-1 by the wired LAN 16 in step S203 and the access point 10-1 is notified of the detected reception level value.

The discrimination in the access point 10-2 about the notification destination of the reception level value by the reception of the reception level confirmation packet that is not to the own access point can be made by inserting the access point name of the access point 10-1 serving as a communication connection destination into the contents of the packet from the terminal 12-2. The access point 10-1 registers the reception level value notified from the access point 10-2 by the reception level notification packet through the wired LAN 16 into the association table 60-11 in a manner similar to the case of 4R of the reception level value of AP10-2 in FIG. 10B.

After the registration of the own reception level value and the reception level value notified from another access point into the association table is completed in the access point 10-1 as mentioned above, the reception level values are compared in step S107. In the case of the association table 60-11 in FIG. 10B, since the own reception level value is equal to 9R and the reception level value received in the access point 10-2 is equal to 4R, the own reception level is large in step S108. Therefore, the roaming is not executed. After the reception level confirmation packet is transmitted in step S6, when a predetermined time T elapses, the terminal 12-2 likewise transmits the reception level confirmation packet by using the channels CH1 and CH2 in step S7 and repeats this operation. The ordinary communication connection between the terminal and the access point is performed for the transmitting interval T of the reception level confirmation packet.

Subsequently, when the terminal 12-2 is away from the access point 10-1 and moves near to the access point 10-2 as shown in FIG. 8, for example, the reception level confirmation packet is transmitted in this state in step S7. The reception level values are detected in the access points 10-1 and 10-2 as shown in steps S109 and S204 in FIGS. 13C and 13D. When the reception level notification packet is transmitted by the wired LAN 16 in step S205, the access point 10-1 registers the reception level values into the association table in step S110. Thus, the association table changes to the contents as shown in FIG. 10C.

The reception level values are compared in step S111. In this case, since the own reception level value is equal to 5R and the reception level value of AP10-2 received in the access point 10-2 is equal to 9R, it is discriminated in step S112 that the own reception level is smaller. The switching of the access point is determined. Therefore, the access point 10-1 deletes the terminal name DE12-2 of the terminal 12-2 from the state of the association table 60-12 in FIG. 10C in step S113 to thereby form an association table 60-13 in FIG. 10D, finishes the communication connection to the terminal 12-2, and transmits a disassociation notification packet to instruct the switching to the next access point to the terminal 12-2 in step S114.

In step S8, the terminal 12-2 recognizes that the next access point is the access point 10-2 from the contents of the received disassociation notification packet and transmits the reassociation request packet to obtain the connection permission to the access point 10-2. When the reassociation request packet from the terminal 12-2 is received, the access point 10-2 registers the terminal name DE12-2 into the association table 60-22 in step S206 as shown in FIG. 12C and transmits the reassociation response packet indicative of the connection permission in step S207. Thus, the communication connection to the access point 10-2 is established in the terminal 12-2 and the communication connection to the access point 10-2 in step S208 is performed in response to the communication connecting request in step S9.

Figure 14A:
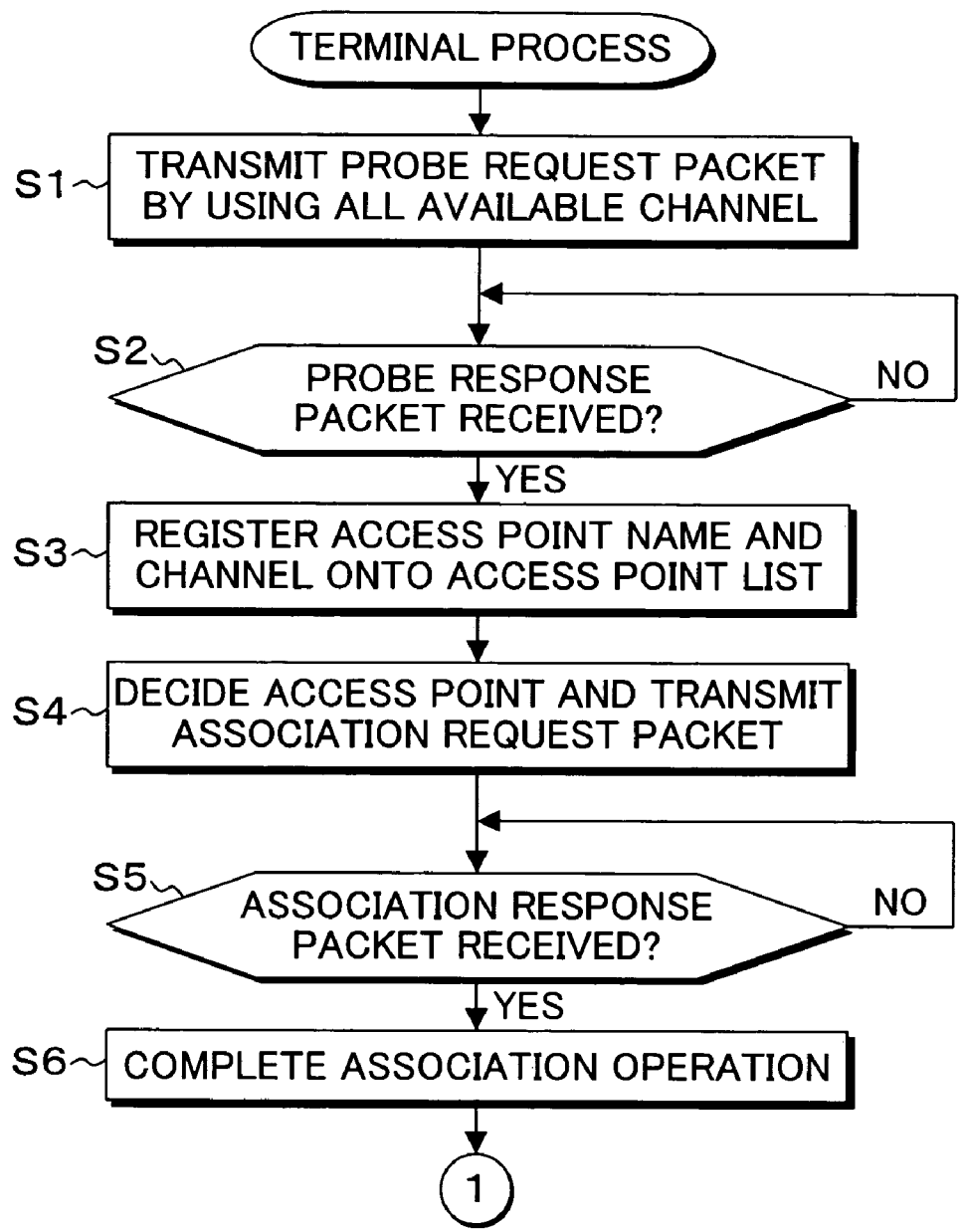
FIGS. 14A and 14B are flowcharts for a terminal process of the invention by the functional construction in FIG. 7.
Figure 14B:
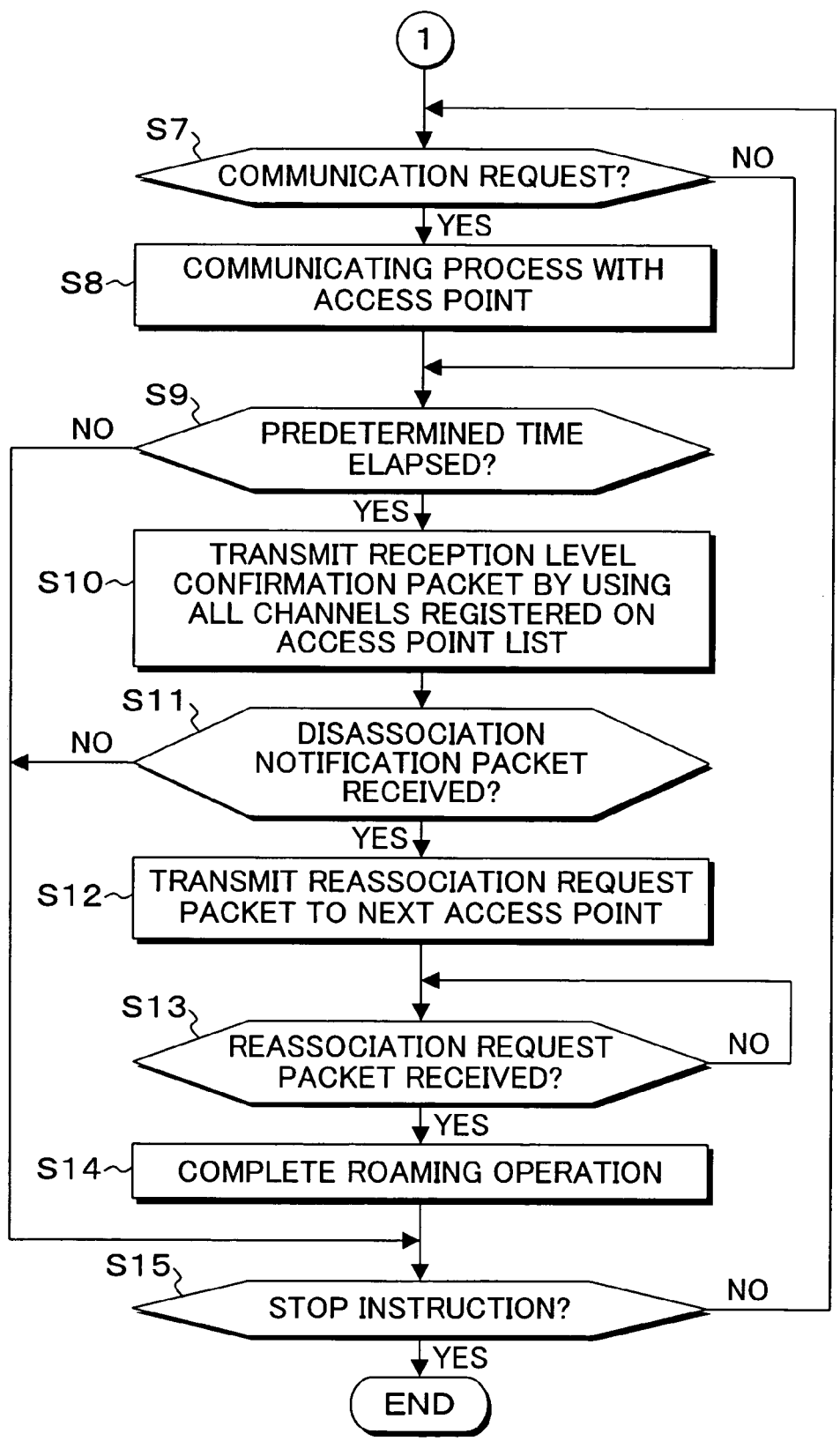

FIGS. 14A and 14B are flowcharts for a terminal process of the invention by the functional construction provided for the wireless LAN controller 50 in FIG. 7. In FIGS. 14A and 14B, the terminal side transmits the probe request packet toward the access point by using all of the available channels in step S1. When the probe response packet from the access point is received in step S2, the access point names and the channels are registered onto the access point list in step S3. Subsequently, a specific one of the registered access points is determined as a connection destination and the association request packet is transmitted. As an algorithm for deciding the specific one of the plurality of access points as a connection destination in this case, a proper method such as receiving order of the probe response packets, random selection, or the like can be used. When the association response packet indicative of the connection permission from the access point is received in step S5 in response to the transmission of the association request packet to the determined access point, the associating operation is completed in step S6.

Subsequently, in step S7, the presence or absence of a communicating request is discriminated. If the communicating request has been issued, the communicating process with the access point which received the connection permission is executed in step S8. In next step S9, whether or not a predetermined time has elapsed is discriminated. If the predetermined time elapsed, the reception level confirmation packet is transmitted by using all of the channels registered on the access point list. In this state, on the access point side whose connection was permitted, if the own reception level value is smaller than the reception level value of another access point, the reassociation notification packet to instruct the switching to the next access point is transmitted. Therefore, when this packet is received in step S1, the reassociation request packet is transmitted to the next access point in step S12.

If the reassociation response packet is received from the next access point in step S13 in response to the reassociation request packet, the roaming operation is completed in step S14. If there is no stop instruction in step S15, the processing routine is returned to step S7 and the communication connection to the next access point is performed.

Figure 15A:
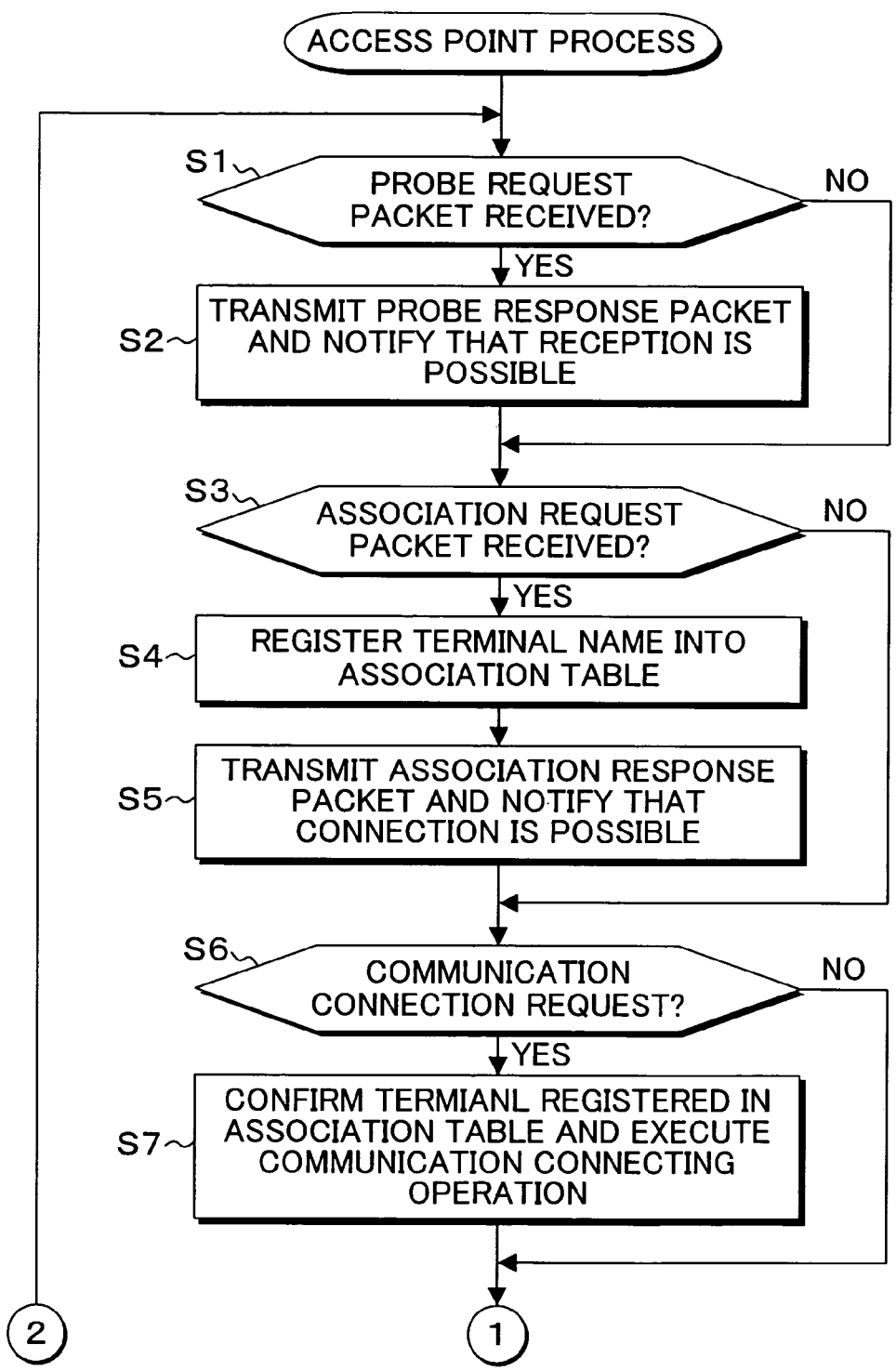
FIGS. 15A and 15B are flowcharts for an access point process of the invention by the functional construction in FIG. 7.
Figure 15B:
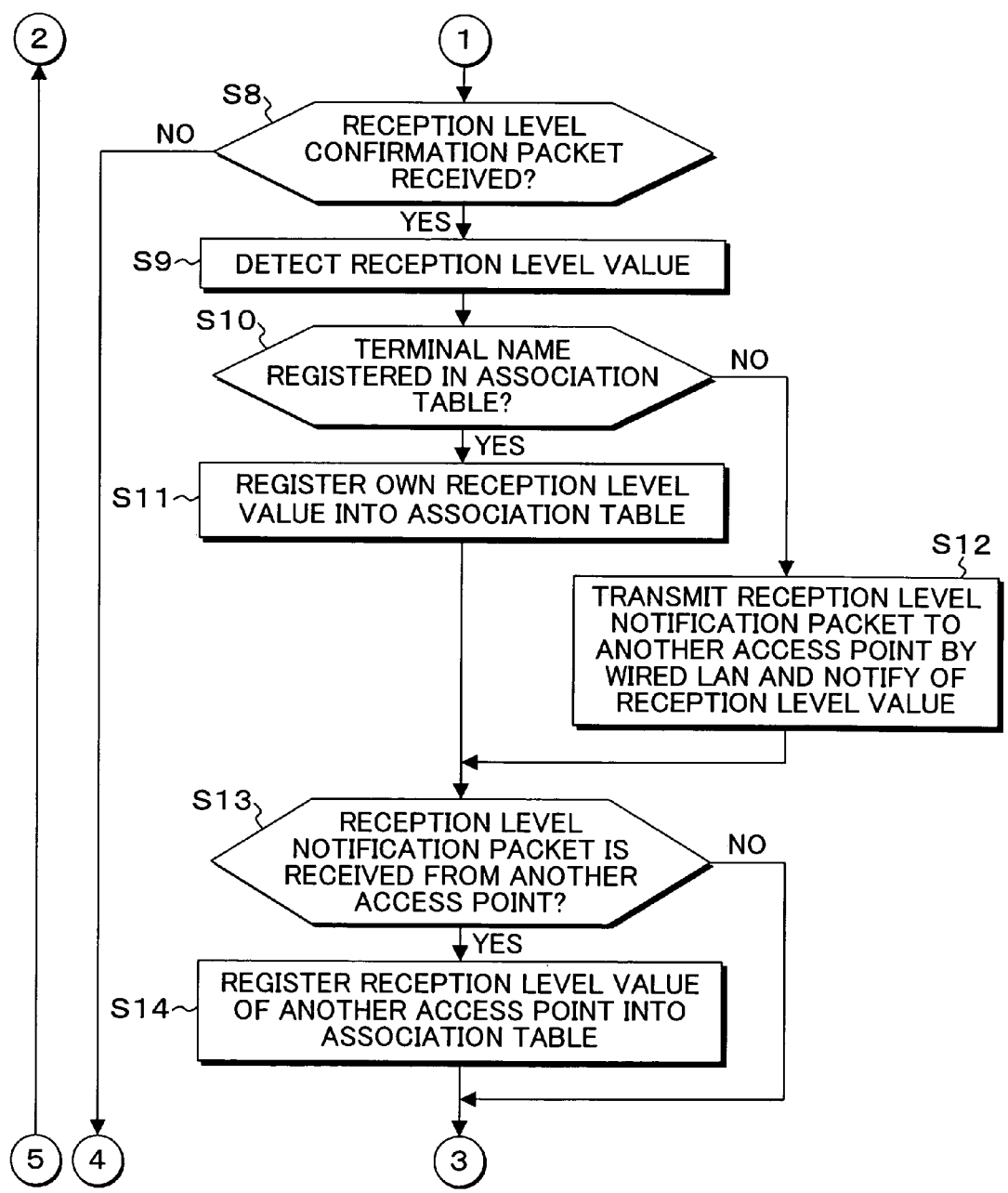

FIGS. 15A and 15B are flowcharts for an access point process of the invention by the functional construction of the wireless LAN controller 26 provided for the access point in FIG. 7. In FIGS. 15A and 15B, when the reception of the probe request packet from the terminal is discriminated in step S1, step S2 follows and the access point side transmits the probe response packet and notifies the terminal that the reception is possible.

When the reception of the association request packet to obtain the connection permission from the terminal is discriminated in step S3, the terminal name is registered into the association table in step S4. After that, the association response packet is transmitted and the connection permission is notified in step S5. If communication connecting request from the terminal is discriminated in step S6, step S7 follows and it is confirmed that the terminal is the terminal registered in the association table and the communication connecting operation is executed.

If the reception level confirmation packet which is transmitted every predetermined time by the terminal is received in step S8, the reception level value is detected by the reception level detecting circuit in step S9. After that, whether or not it is the terminal name registered in the association table is discriminated in step S10. If it is the registered terminal name, it is determined that it is the reception level confirmation packet to the own access point. It is registered into the area of the own reception level value in the association table in step S11. If it is not the terminal name registered in the association table in step S10, the reception level notification packet is transmitted by the wired LAN 16 to another access point recognized from the contents of the reception level confirmation packet and the detected reception level value is notified in step S12.

Figure 15C:
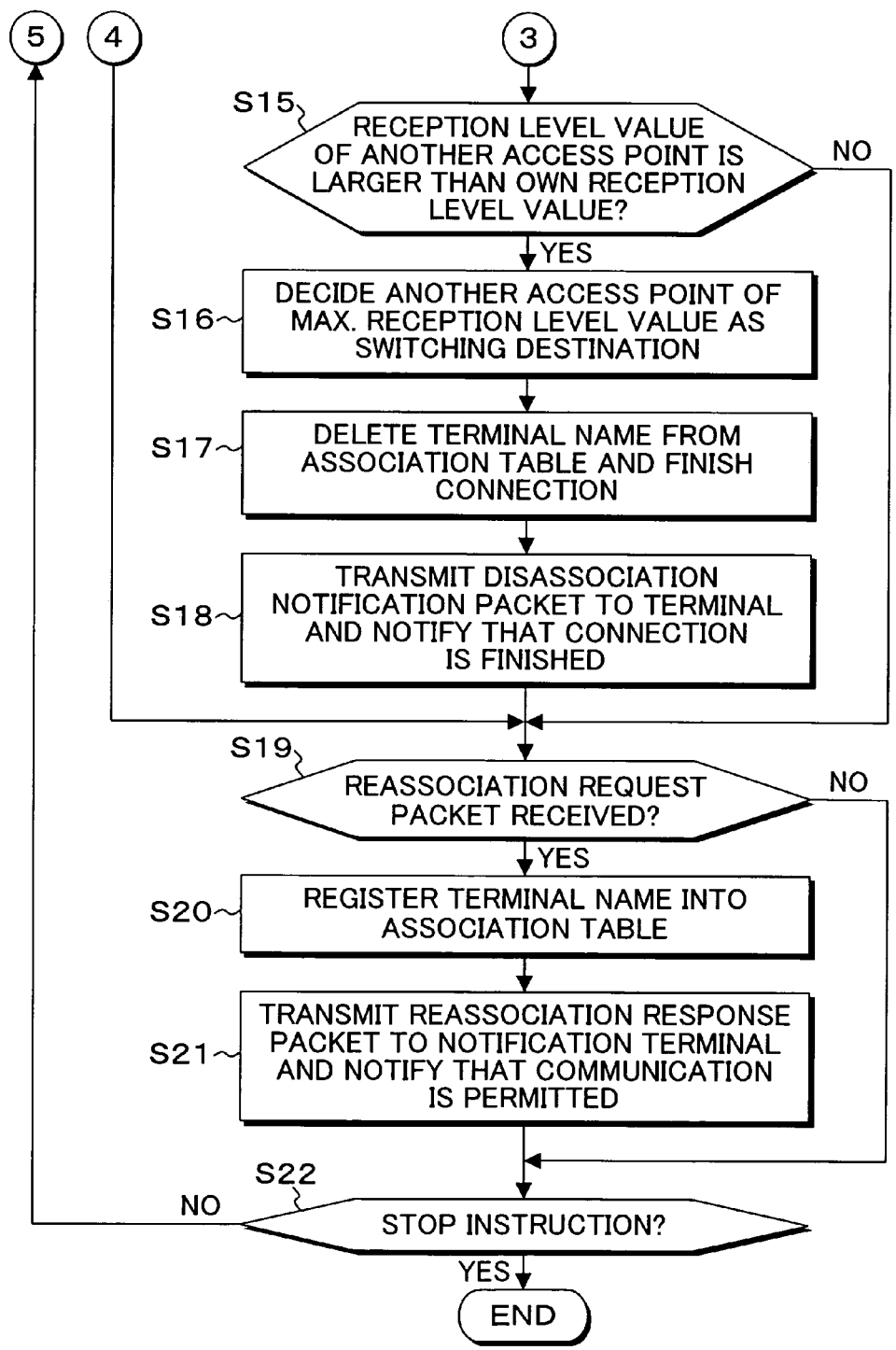
FIG. 15C is a flowchart for the access point process which is a sequel to FIGS. 15A and 15B.

Subsequently, when the reception level notification packet is received from another access point in step S13 in FIG. 15C, the reception level value is registered into the area of another access point in the association table in step S14. The own reception level value registered in the association table is compared with the reception level value notified from another access point in step S15. If the reception level value notified from another access point is larger than the own reception level value, step S16 follows and another access point in which the reception level value becomes the maximum is determined to be a switching destination.

Subsequently, in step S17, the terminal name as a switching target of the access point is deleted from the association table and the connection is finished. In step S18, the disassociation notification packet is transmitted to the terminal as a switching target of the access point and the end of the connection and the reassociating operation to the next access point are instructed. When the reassociation request packet is received from the terminal in step S19, the terminal name is registered into the association table in step S20, thereafter, the reassociation response packet is transmitted to the request terminal and the communication permission is notified thereto in step S21. The processes in steps S19 to S21 are the processes of the roaming operation when the terminal switches the access point to the next access point. The processes from step S1 are repeated until the stop instruction is issued in step S22.

Although the embodiment has been described with respect to the example of the case where the reception level detecting unit 62 and the access point switching instructing unit 64 which are necessary for the roaming operation of the invention as shown in FIG. 7 are provided for the wireless LAN controller 26, they can be also provided as functions of the application program of the processor 18.

Although the embodiment has been also described as an example of the case where the functions of the measurement packet transmitting unit 72 and the access point switching control unit 74 for the roaming on the terminal 12-1 side are provided for the wireless LAN controller 50 of the wireless LAN card which is attached into the card slot of the terminal 12-1, it is not limited to the wireless LAN card but can be also fixedly installed as a wireless LAN board to the terminal itself. The terminal as a target of the roaming operation of the invention is not limited to the personal computer but a proper terminal such as PDA, cellular phone, or the like is also included.

Although the invention has been described with respect to the wireless LAN which conforms with IEEE802.11 as an example, it can be also similarly applied to other wireless LANs. The invention incorporates many proper modifications without losing the objects and advantages of the invention. Further, the invention is not limited by the numerical values shown in the foregoing embodiment.

What is claimed is:

1. A program embodied in a computer readable storage device for allowing a relay apparatus for relaying wireless communication that is made by a wireless communicating apparatus on a wireless network to execute:
   a detecting step wherein measurement information transmitted from said wireless communicating apparatus is received, a reception level value is detected, in the case of a first relay apparatus where the measurement information from the wireless communicating apparatus has been notified of connection permission, said reception level value is managed, in the case of a second relay apparatus where the measurement information from the wireless communicating apparatus is not notified of the connection permission, said reception level value is notified to the first relay apparatus and wherein confirmation information transmitted from said wireless communicating apparatus is received and the reception level value is detected, with respect to the first relay apparatus, said reception level value is registered into a management table, and with respect to said second relay apparatus, said reception level value is notified through a wired network to said first relay apparatus;
   a receiving step wherein the reception level value notified from said second relay apparatus is received by the first relay apparatus and registered into the management table; and
   a switching instructing step wherein the reception level value of said wireless communicating apparatus which has been notified of the connection permission by the first relay apparatus is compared with the reception level value from the second relay apparatus, when the reception level value from said second relay apparatus exceeds the first relay apparatus reception level value, the connection permission of said first relay apparatus to said wireless communicating apparatus is cancelled by said first relay apparatus from said management table, and notification information to notify said wireless communicating apparatus of the switching to said second relay apparatus is transmitted.

2. A program embodied in a computer readable storage device according to claim 1, wherein a communication possible range of said first relay apparatus and that of second another relay apparatus mutually overlap and different channels are set in said relay apparatuses and said wireless communicating apparatus can connect the communication by using all of the channels set in the relay apparatuses.

3. A program embodied in a computer readable storage device according to claim 1, wherein prior to said detecting step, said receiving step, and said switching instructing step, said program allows said first relay apparatus to execute:
   a search response step wherein when request information to search for the communication possible relay apparatus is received in association with turn-on of a power source of said wireless communicating apparatus, response information showing that the communication is possible is transmitted; and
   a response step wherein when request information to obtain the connection permission is received from said wireless communicating apparatus, the identification information of said wireless communicating apparatus is registered into said management table and response information showing the connection permission is transmitted.

4. A program embodied in a computer readable storage device according to claim 1, wherein said wireless communicating apparatus periodically transmits said measurement information.

5. A program embodied in a computer readable storage device for allowing a wireless communicating apparatus of a wireless network for selecting and connecting an optimum one of a plurality of relay apparatuses to execute:
   a transmitting step wherein measurement information to confirm a reception level value is transmitted to the plurality of relay apparatuses existing in a communication possible range, wherein a list on which identification information of the communication possible relay apparatuses and channels have been registered by a searching operation at the time of turn-on of a power source is provided, and confirmation information to detect the reception level value is transmitted to the relay apparatuses registered on said list; and
   a switching control step wherein when a switching notification to switch from a first one of the relay apparatuses which has issued a connection permission notification to a second one of the relay apparatuses is received, communication connection is requested and request information to request the communication connection is transmitted as a next connection destination to said second relay apparatus and a permission response including response information showing connection permission is received, thereby switching to the communication connection to the second relay apparatus, wherein the first relay apparatus transmits the switching notification when the reception level value from the measurement information transmitted by said wireless communicating apparatus is exceeded by the reception level value notified to the first relay apparatus from the second relay apparatus.

6. A program embodied in a computer readable storage device according to claim 5, wherein the communication possible range of said first relay apparatus and those of the other of the plurality of relay apparatuses mutually overlap and different channels are set in said relay apparatuses and said wireless communicating apparatus can connect the communication by using all of the channels set in the relay apparatuses.

7. A program embodied in a computer readable storage device according to claim 5, wherein prior to said transmitting step and said switching control step, said program allows said wireless communication apparatus to execute:

a searching step wherein request information to obtain use permission to all channels set in said plurality of relay apparatuses is transmitted at the time of the turn-on of the power source of said wireless communicating apparatus, and when response information showing that the communication is possible is received from said relay apparatuses, identification information and the channel of said relay apparatuses are registered onto said list; and a requesting step wherein a specific relay apparatus is selected from said plurality of relay apparatuses which have transmitted said response information, the request information to obtain the connection permission is transmitted, the response information showing the connection permission is received from the specific relay apparatus as a transmission destination, and a communication connecting operation is started.

8. A program embodied in a computer readable storage device according to claim 5, wherein said wireless communicating apparatus periodically transmits said measurement information.

9. A relay apparatus control method of a wireless network for selecting and connecting an optimum one of a plurality of fixedly arranged relay apparatuses in association with movement of a wireless communicating apparatus, comprising:

a detecting step wherein measurement information transmitted from said wireless communicating apparatus is received by a first relay apparatus, a reception level value is detected, in the case of the first relay apparatus, where the measurement information from the wireless communicating apparatus which has been notified of connection permission, said reception level value is managed, in the case of a second relay apparatus, where the measurement information from the wireless communicating apparatus which is not notified of the connection permission, said reception level value is notified to the first relay apparatus which has been notified of the connection permission, and wherein confirmation information transmitted from said wireless communicating apparatus is received and the reception level value is detected, with respect to the first relay apparatus, said reception level value is registered into the management table, and with respect to the second relay apparatus, said reception level value is notified through a wired network to said first relay apparatus;

a receiving step wherein the reception level value notified from said second relay apparatus is received by said first relay apparatus registered into the management table; and a switching instructing step wherein the reception level value of the wireless communicating apparatus which has been notified of the connection permission by the first relay apparatus is compared with the reception level value from said second relay apparatus, when the reception level value from said second relay apparatus exceeds the reception level value of the first relay apparatus, the connection permission to said wireless communicating apparatus is cancelled by the first relay apparatus by deleting identification information of the wireless communicating apparatus from said management table, and notification information to notify said wireless communicating apparatus of the switching to said second relay apparatus which is connected to next is transmitted.

10. A method according to claim 9, wherein a communication possible range of said first relay apparatus and that of said second another relay apparatus mutually overlap and different channels are set in said relay apparatuses and said wireless communicating apparatus can connect the communication by using all of the channels set in the relay apparatuses.

11. A method according to claim 9, wherein prior to said detecting step, said receiving step, and said switching instructing step, said program allows said first relay apparatus to execute:

a search response step wherein when request information to search for the communication possible relay apparatus is received in association with turn-on of a power source of said wireless communicating apparatus, response information showing that the communication is possible is transmitted; and a response step wherein when request information to obtain the connection permission is received from said wireless communicating apparatus, the identification information of said wireless communicating apparatus is registered into said management table and response information showing the connection permission is transmitted.

12. A method according to claim 9, wherein said wireless communicating apparatus periodically transmits said measurement information.

13. A wireless communicating apparatus control method of a wireless network for selecting and connecting an optimum one of a plurality of relay apparatuses, comprising:

a transmitting step wherein measurement information to confirm a reception level value is transmitted to the plurality of relay apparatuses existing in a communication possible range wherein a list on which identification information of the communication possible relay apparatuses and channels have been registered by a searching operation at the time of turn-on of a power source is provided, and confirmation information to detect the reception level value is transmitted to the relay apparatuses registered on said list; and a switching control step wherein when a switching notification to switch from a first one of the relay apparatuses which has issued a connection permission notification to a second one of the relay apparatuses is received, communication connection is requested and request information to request the communication connection is transmitted as a next connection destination to the second relay apparatus and a permission response including response information showing connection permission is received, thereby switching to the communication connection to the second relay apparatus, wherein the first relay apparatus transmits the switching notification when the reception level value from the measurement information transmitted by said wireless communicating apparatus is exceeded by the reception level value notified to the first relay apparatus from the second relay apparatus.

14. A method according to claim 13, wherein a communication possible range of said first relay apparatus and that of said second relay apparatus mutually overlap and different channels are set in said relay apparatuses and said wireless communicating apparatus can connect the communication by using all of the channels set in the relay apparatuses.

15. A method according to claim 13, wherein prior to said transmitting step and said switching control step, said program further comprises:

a searching step wherein request information to obtain use permission to all channels set in said plurality of relay apparatuses is transmitted at the time of the turn-on of the power source, and when response information showing that the communication is possible is received from said relay apparatuses, identification information and the channel of said relay apparatuses are registered onto said list; and a requesting step wherein a specific relay apparatus is selected from said plurality of relay apparatuses which have transmitted said response information, the request information to obtain the connection permission is transmitted, the response information showing the connection permission is received from the specific relay apparatus as a transmission destination, and a communication connecting operation is started.

16. A method according to claim 13, wherein said wireless communicating apparatus periodically transmits said measurement information.

17. A system for selecting and connecting an optimum one of a plurality of relay apparatuses in association with movement of a wireless communicating apparatus, wherein a first relay apparatus comprises:

a detecting unit which receives measurement information transmitted from said wireless communicating apparatus, detects a reception level value, in the case of the measurement information from the wireless communicating apparatus which has been notified of connection permission, manages said reception level value, in the case of the measurement information from the wireless communicating apparatus which is not notified of the connection permission, notifies said reception level value to a second relay apparatus which has been notified of the connection permission, and further receives and manages the reception level value notified from said second relay apparatus, and wherein said detecting unit of said first relay apparatus receives confirmation information periodically transmitted from said wireless communicating apparatus and detects the reception level value, in the case of the confirmation information from the wireless communicating apparatus which is not notified of the connection permission, notifies said reception level value via a wired network to said second relay apparatus which has been notified of the connection permission, and registers the reception level value notified from said first relay apparatus via said wired network into said management table; and a switching instructing unit which compares the reception level value of the wireless communicating apparatus which has been notified of the connection permission by the first relay apparatus with the reception level value of said second relay apparatus, when the reception level value of said second relay apparatus exceeds the first reception level value, cancels the connection permission by deleting identification information of said wireless communicating apparatus from said management table, and transmits notification information to notify said wireless communicating apparatus of the switching to the second relay apparatus which is connected to next, and said wireless communicating apparatus comprises:

a transmitting unit which transmits measurement information to confirm the reception level value to the relay apparatuses existing in a communication possible range and wherein said transmitting unit has a list on which the identification information of the communication possible relay apparatuses and the channels have been registered by a searching operation at the time of turn-on of a power source and transmits confirmation information to detect the reception level value to the relay apparatuses registered on said list; and a switching control unit which, when a switching notification to switch from the first relay apparatus which has issued a connection permission notification to the second relay apparatus is received, requests communication connection to the second relay apparatus and receives a permission response, and transmits request information to request the communication connection to the second relay apparatus as a next connection destination when the switching notification to switch from the first relay apparatus which has issued the connection permission notification to the second relay apparatus which is connected to next and receives the response information showing the connection permission, thereby switching to the communication connection to the second relay apparatus.

18. A system according to claim 17, wherein a communication possible range of said first relay apparatus and that of said second relay apparatus mutually overlap and different channels are set in said relay apparatuses and said wireless communicating apparatus can connect the communication by using all of the channels set in the relay apparatuses.

19. A system according to claim 17, wherein
said first relay apparatus further comprises:
a search response unit which transmits response information showing that the communication is possible when the request information to search for the communication possible relay apparatus in association of the turn-on of the power source of said wireless communicating apparatus is received; and
a response unit which registers the identification information of said wireless communicating apparatus into said management table when the request information to obtain the connection permission is received from said wireless communicating apparatus and transmits the response information showing the connection permission, and said wireless communicating apparatus further comprises:

a searching unit which transmits request information to obtain use permission to all channels set in said plurality of relay apparatuses at the time of the turn-on of the power source, and when the response information showing that the communication is possible is received from said relay apparatuses, registers the identification information and the channel of said relay apparatuses onto said list; and a requesting unit which selects a specific relay apparatus from said plurality of relay apparatuses which have transmitted said response information, transmits the request information to obtain the connection permission, receives the response information showing the connection permission from the specific relay apparatus as a transmission destination, and staffs a communication connecting operation.

20. A system according to claim 17, wherein said wireless communicating apparatus periodically transmits said measurement information.

21. A relay apparatus of a wireless network, comprising:

a detecting unit which receives measurement information transmitted from a wireless communicating apparatus, detects a reception level value, in the case of the measurement information from the wireless communicating apparatus which has been notified of connection permission, manages said reception level value, in the case of the measurement information from the wireless communicating apparatus which is not notified of the connection permission, notifies said reception level value to a second relay apparatus which has been notified of the connection permission, and further receives and manages the reception level value notified from said second relay apparatus and wherein said detecting unit receives confirmation information transmitted from said wireless communicating apparatus, and detects the reception level value, in the case of the confirmation information from the wireless communicating apparatus which has been notified of the connection permission, registers said reception level value into a management table, in the case of the confirmation information from the wireless communicating apparatus which is not notified of the connection permission, notifies said reception level value through a wired network to said second relay apparatus which has been notified of the connection permission, and further registers the reception level value notified from said second relay apparatus through the wired network into said management table of the relay apparatus; and a switching instructing unit which compares the reception level value of said wireless communicating apparatus which has been notified of the connection permission by the first relay apparatus with the reception level value of said second relay apparatus, when the reception level value of said second relay apparatus exceeds the reception level value of the first relay apparatus, cancels the connection permission to said wireless communicating apparatus by deleting identification information of the wireless communicating apparatus from said management table, and transmits notification information to notify said wireless communicating apparatus of the switching to the second relay apparatus which is connected to next.

22. An apparatus according to claim 21, wherein a communication possible range of said relay apparatus and that of said second relay apparatus mutually overlap and different channels are set in said relay apparatuses and said wireless communicating apparatus can connect the communication by using all of the channels set in the relay apparatuses.

23. An apparatus according to claim 21, further comprising:

a search response unit which transmits response information showing that communication is possible when request information to search for a communication possible relay apparatus is received in association with turn-on of a power source of said wireless communicating apparatus; and a response unit which registers the identification information of said wireless communicating apparatus into said management table and transmits response information showing connection permission when request information to obtain the connection permission is received from said wireless communicating apparatus.

24. An apparatus according to claim 21, wherein said wireless communicating apparatus periodically transmits said measurement information.

25. A wireless communicating apparatus of a wireless network for selecting and connecting an optimum one of a plurality of relay apparatuses, the wireless communicating apparatus of the invention comprises:

a transmitting unit which transmits measurement information to confirm a reception level value to the plurality of relay apparatuses existing in a communication possible range, and; and a switching control unit which, when a switching notification to switch from a first one of the relay apparatuses which has issued a connection permission notification to a second one of the relay apparatuses is received, requests communication connection to the second relay apparatus and receives a permission response, thereby switching to the communication connection to the second relay apparatus;

a searching unit which transmits request information to obtain use permission to all channels set in said plurality of relay apparatuses at the time of the turn-on of the power source, and when the response information showing that the communication is possible is received from said relay apparatuses registers the identification information and the channel of said relay apparatuses onto said list; and a requesting unit which selects a specific relay apparatus from said plurality of relay apparatuses which have transmitted said response information, transmits the request information to obtain the connection permission, receives the response information showing the connection permission from the specific relay apparatus as a transmission destination, and starts a communication connecting operation, wherein the first relay apparatus transmits the switching notification when the reception level value from the measurement information transmitted by said wireless communicating apparatus is exceeded by the reception level value notified to the first relay apparatus from the second relay apparatus.

26. An apparatus according to claim 25, wherein a communication possible range of said first relay apparatus and that of said second relay apparatus mutually overlap and different channels are set in said relay apparatuses and said wireless communicating apparatus can connect the communication by using all of the channels set in the relay apparatuses.

27. An apparatus according to claim 25, wherein:
said transmitting unit
has a list on which the identification information of the communication possible relay apparatuses and the channels have been registered by a searching operation at the time of turn-on of a power source and
transmits confirmation information to detect the reception level value to the relay apparatuses registered on said list; and said switching control unit
transmits request information to request the communication connection to the second relay apparatus as a next connection destination when the switching notification to switch from the first relay apparatus which has issued the connection permission notification to the second relay apparatus which is connected to next and receives the response information showing the connection permission, thereby switching to the communication connection to the second relay apparatus.

28. An apparatus according to claim 25, wherein said wireless communicating apparatus periodically transmits said measurement information.

* * * * *